Dec. 13, 1955  W. H. UHL  2,726,812
POSTAGE METER CONSTRUCTION
Filed Sept. 29, 1951  30 Sheets-Sheet 1

INVENTOR
William H. Uhl
BY
Watson, Johnson, Leavenworth & Blair
ATTORNEYS

INVENTOR
William H. Uhl
BY
Watson, Johnson, Leavenworth & Blair
ATTORNEYS

Dec. 13, 1955 W. H. UHL 2,726,812
POSTAGE METER CONSTRUCTION
Filed Sept. 29, 1951 30 Sheets-Sheet 6

INVENTOR
William H. Uhl
BY
Watson, Johnson, Leavenworth & Blair
ATTORNEYS

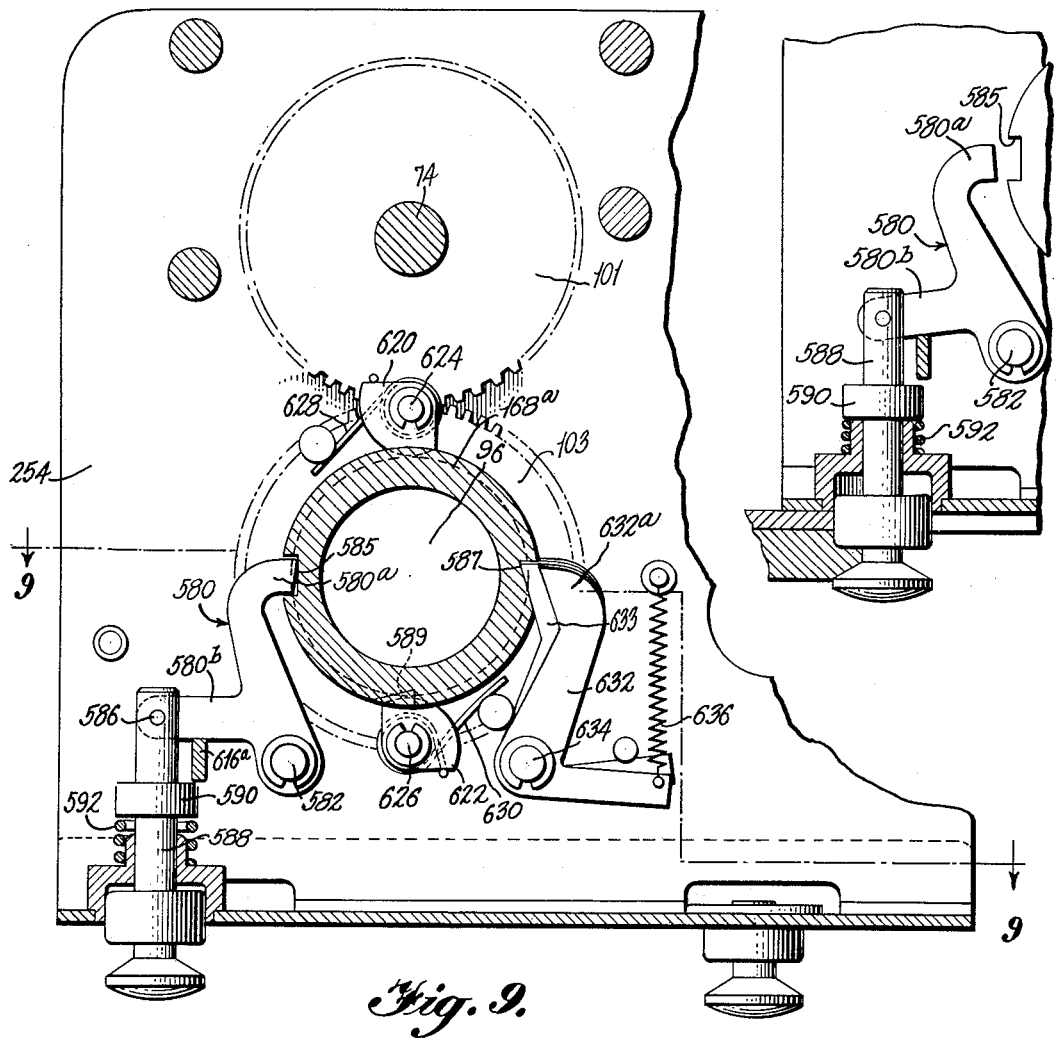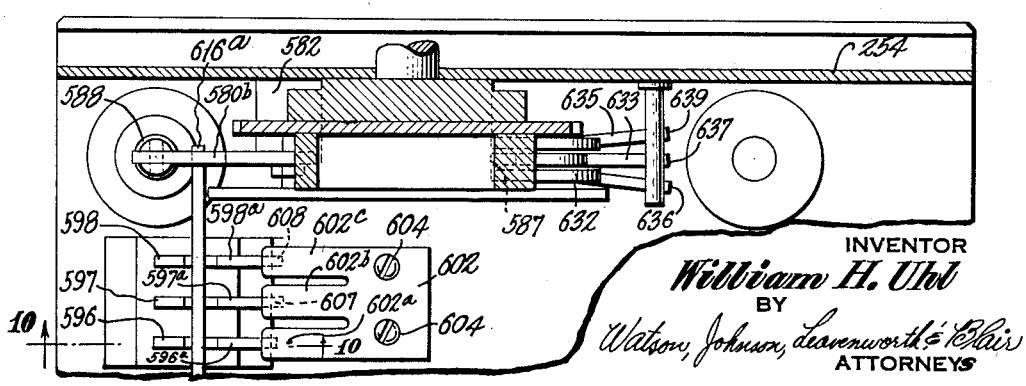

Dec. 13, 1955  W. H. UHL  2,726,812
POSTAGE METER CONSTRUCTION
Filed Sept. 29, 1951  30 Sheets-Sheet 8
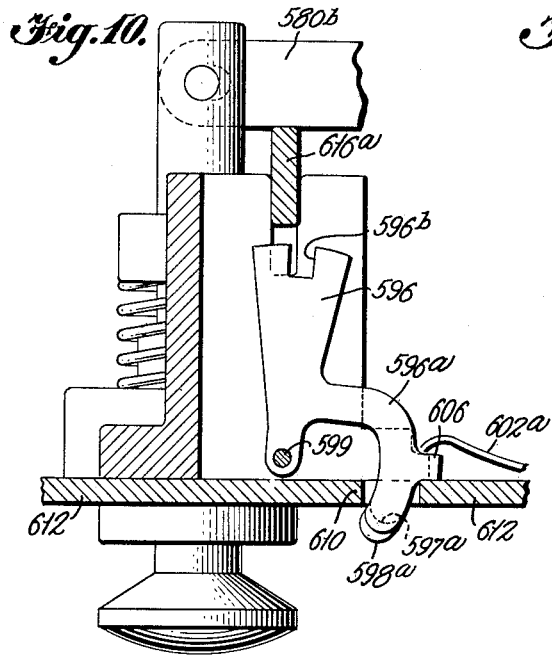
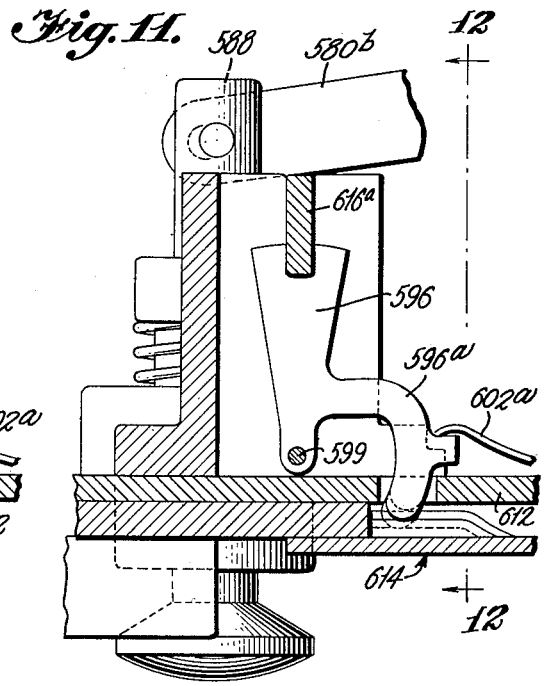
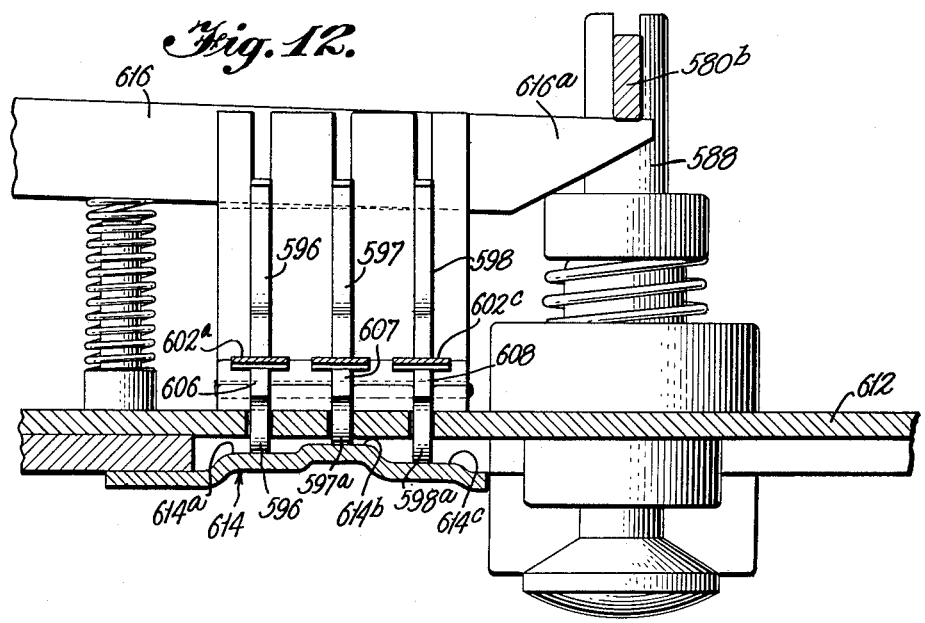
INVENTOR
*William H. Uhl*
BY
*Watson, Johnson, Leavenworth & Blair*
ATTORNEYS

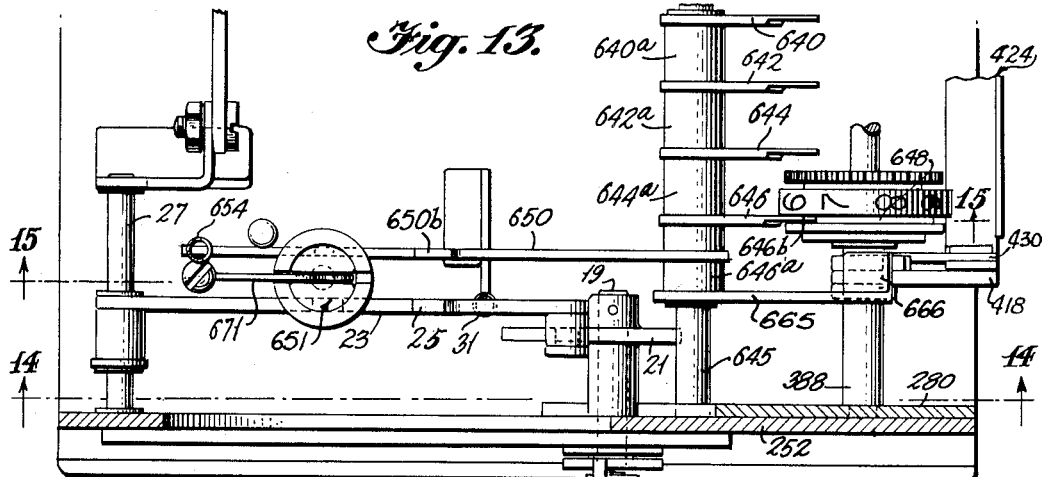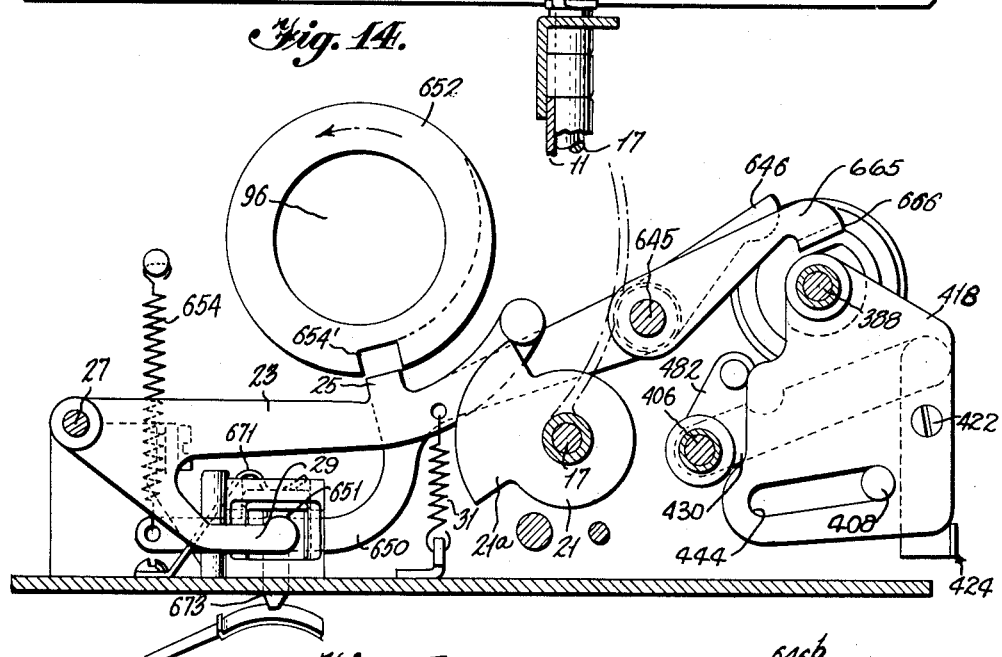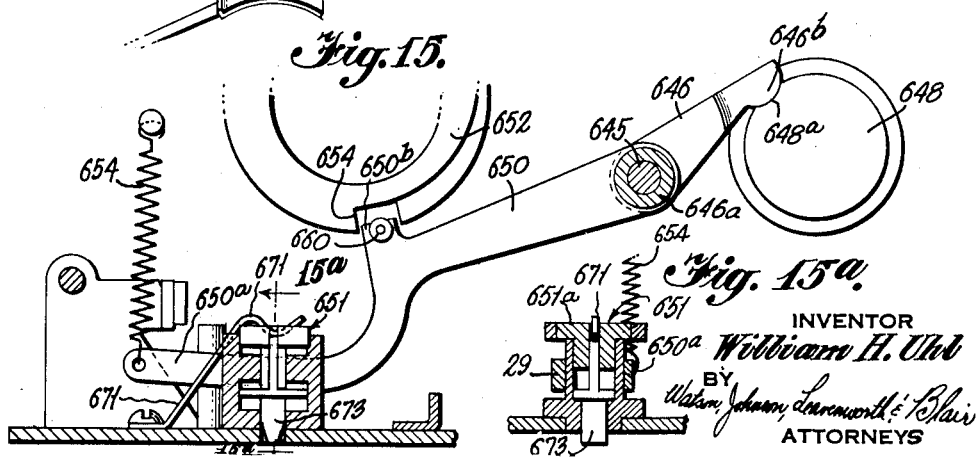

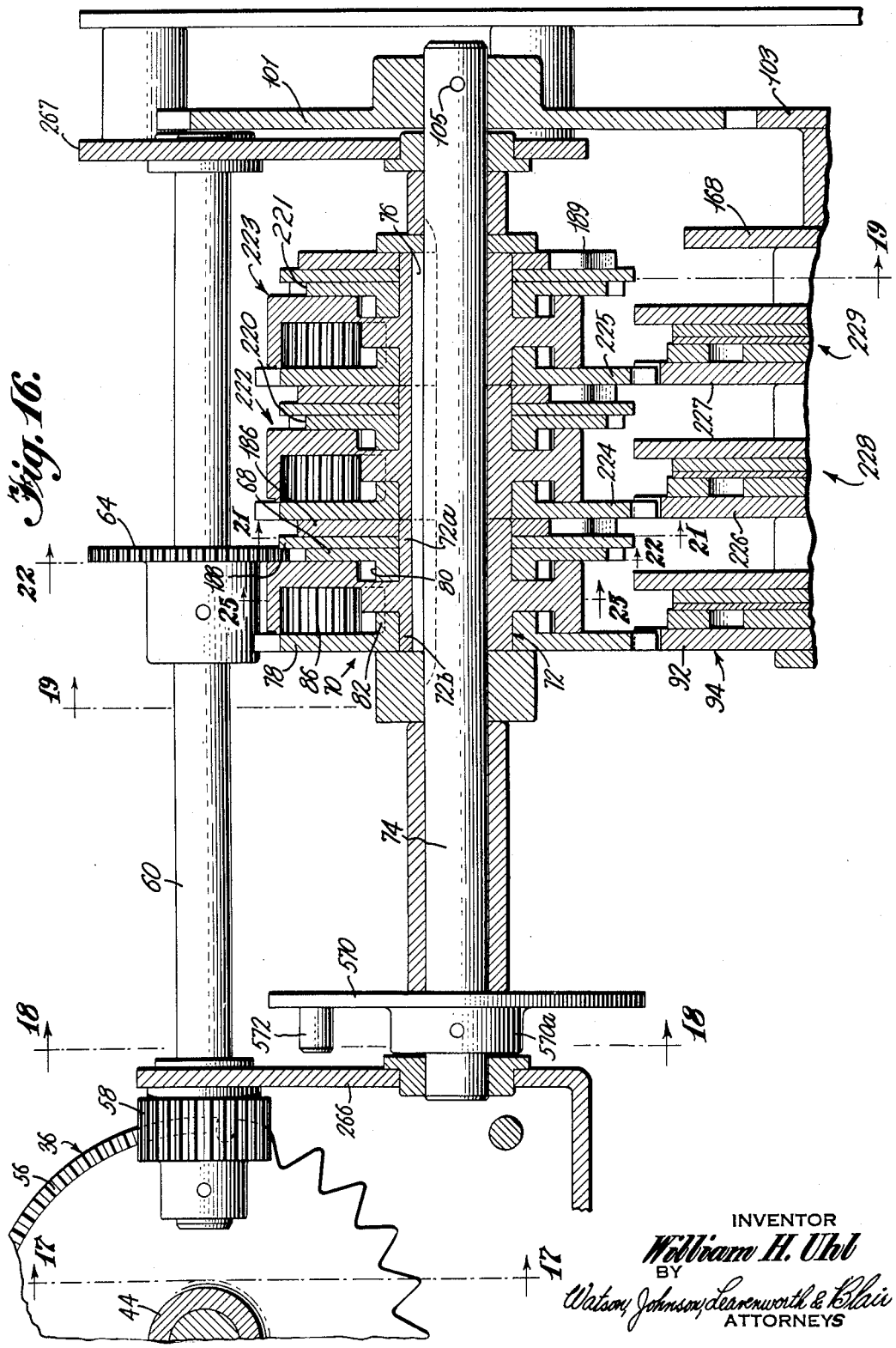

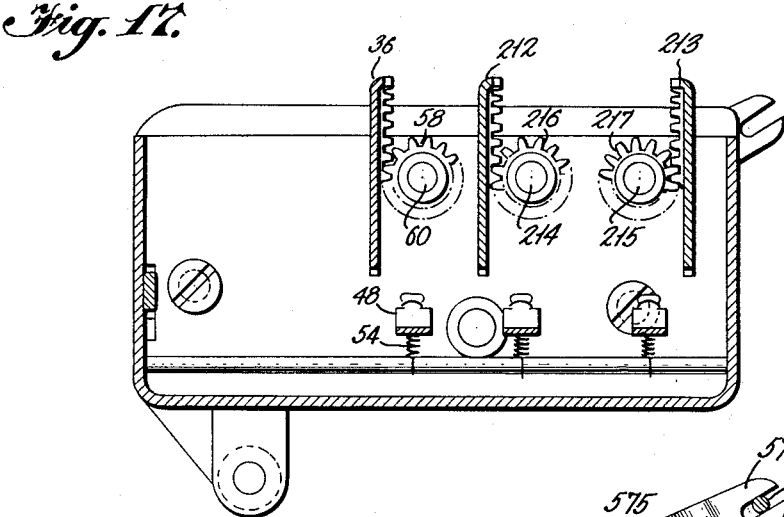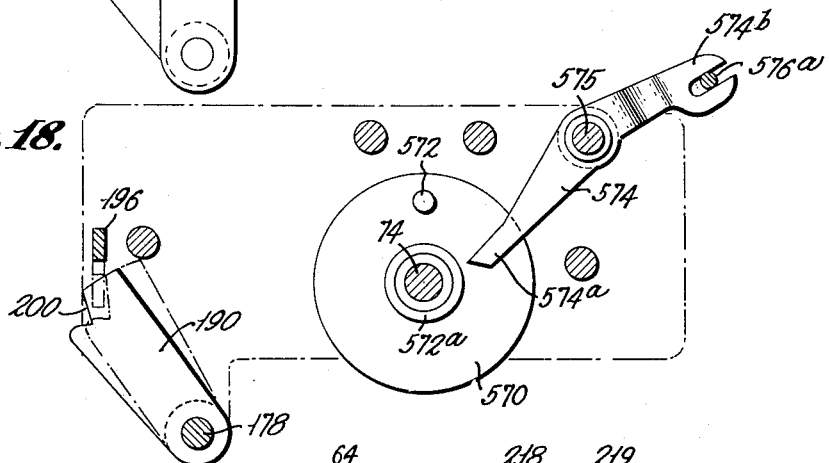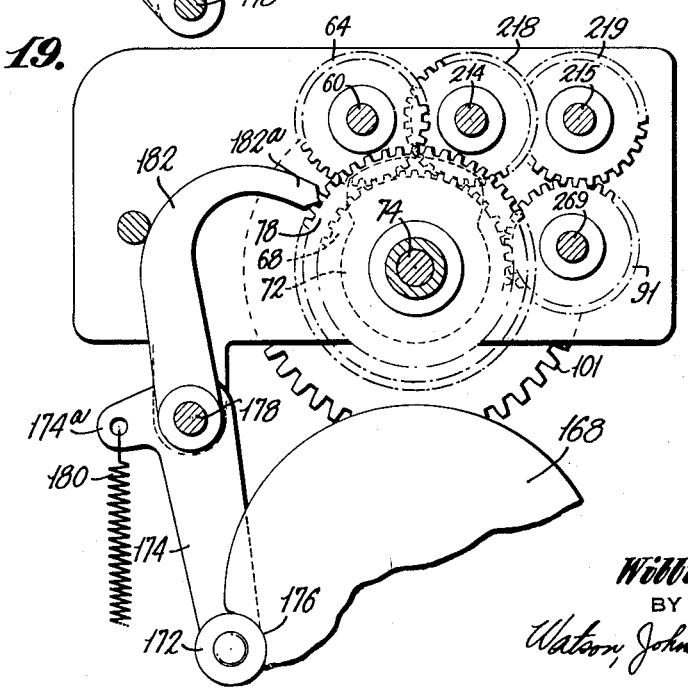

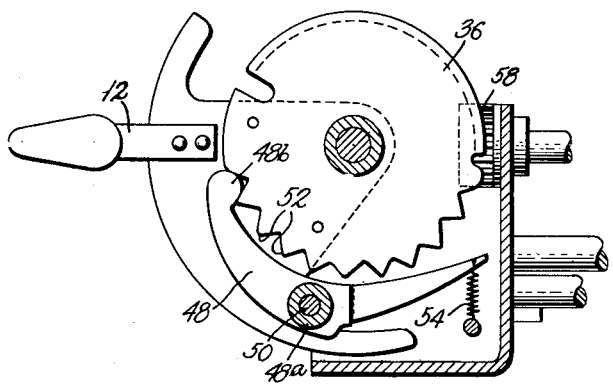
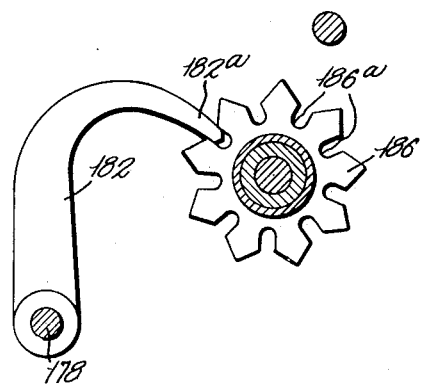
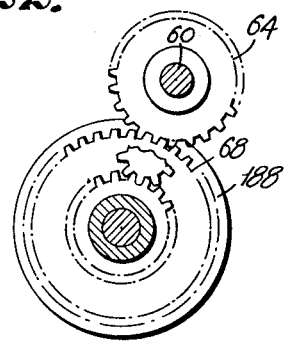
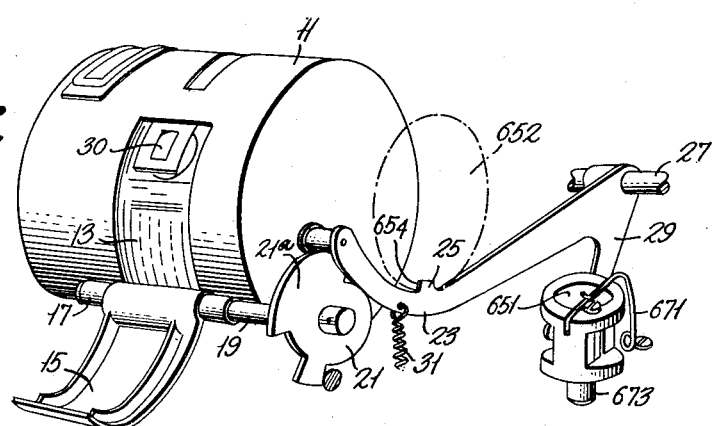

Dec. 13, 1955 W. H. UHL 2,726,812
POSTAGE METER CONSTRUCTION
Filed Sept. 29, 1951 30 Sheets-Sheet 17

INVENTOR
*William H. Uhl*
BY
*Watson, Johnson, Learnworth & Blair*
ATTORNEYS

Dec. 13, 1955  W. H. UHL  2,726,812
POSTAGE METER CONSTRUCTION
Filed Sept. 29, 1951  30 Sheets-Sheet 18

INVENTOR
William H. Uhl
BY
Watson, Johnson, Leavenworth & Blair
ATTORNEYS

Dec. 13, 1955 W. H. UHL 2,726,812
POSTAGE METER CONSTRUCTION
Filed Sept. 29, 1951 30 Sheets-Sheet 19

INVENTOR
William H. Uhl
BY Watson, Johnson,
Leavenworth & Blair
ATTORNEYS

Dec. 13, 1955  W. H. UHL  2,726,812
POSTAGE METER CONSTRUCTION
Filed Sept. 29, 1951  30 Sheets-Sheet 20

INVENTOR
*William H. Uhl*
BY
*Watson, Johnson, Leavenworth & Blair*
ATTORNEYS

Dec. 13, 1955 W. H. UHL 2,726,812
POSTAGE METER CONSTRUCTION
Filed Sept. 29, 1951 30 Sheets-Sheet 22

INVENTOR
William H. Uhl
BY
Watson, Johnson, Learonworth & Blair
ATTORNEYS

Dec. 13, 1955   W. H. UHL   2,726,812
POSTAGE METER CONSTRUCTION
Filed Sept. 29, 1951   30 Sheets-Sheet 23

INVENTOR
William H. Uhl
BY
Watson, Johnson, Learnworth & Blair
ATTORNEYS

Dec. 13, 1955 W. H. UHL 2,726,812
POSTAGE METER CONSTRUCTION
Filed Sept. 29, 1951 30 Sheets-Sheet 24

INVENTOR
William H. Uhl
BY
Watson, Johnson, Learnworth & Blair
ATTORNEYS

Dec. 13, 1955 W. H. UHL 2,726,812
POSTAGE METER CONSTRUCTION
Filed Sept. 29, 1951 30 Sheets-Sheet 25

INVENTOR
William H. Uhl
BY
Watson, Johnson, Leavenworth & Blair
ATTORNEYS

Dec. 13, 1955 W. H. UHL 2,726,812
POSTAGE METER CONSTRUCTION
Filed Sept. 29, 1951 30 Sheets-Sheet 28
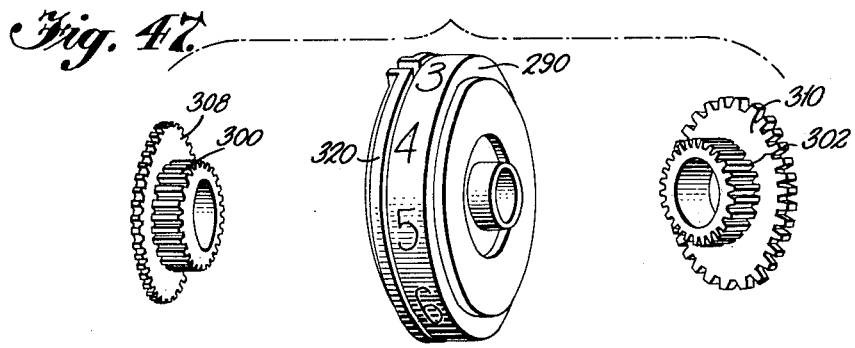
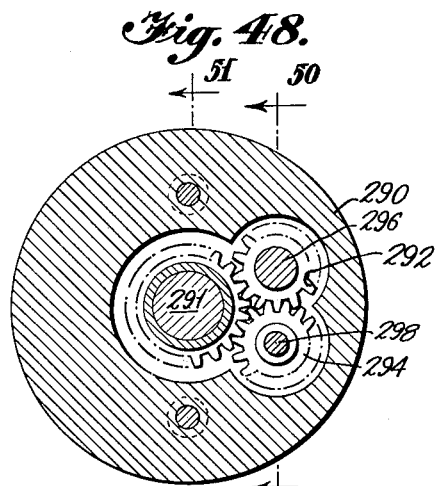
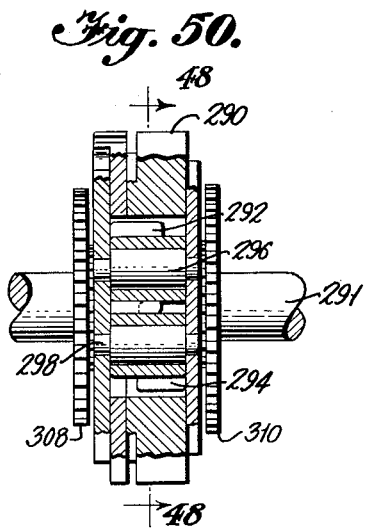
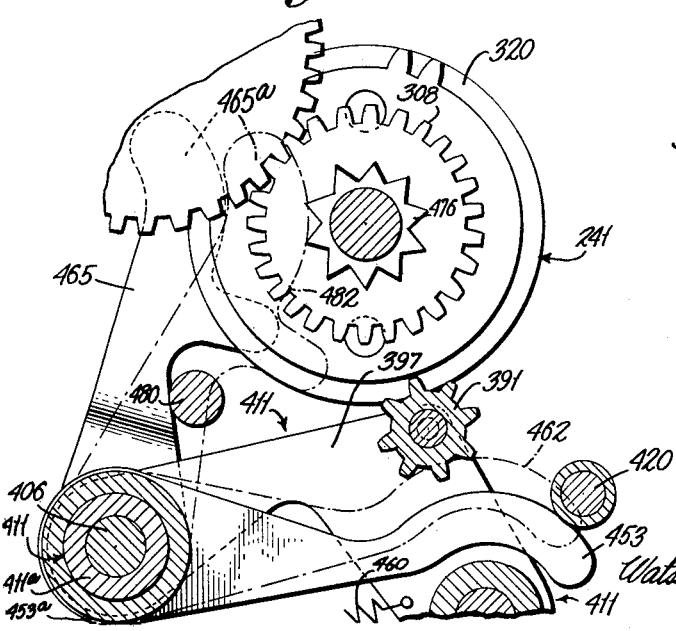
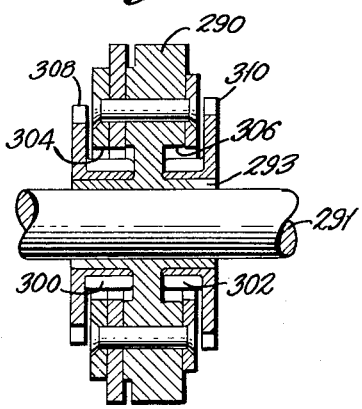
INVENTOR
William H. Uhl
BY
Watson, Johnson, Learnworth & Blair
ATTORNEYS

United States Patent Office 2,726,812
Patented Dec. 13, 1955

2,726,812

POSTAGE METER CONSTRUCTION

William H. Uhl, Penfield, N. Y., assignor to Commercial Controls Corporation, Rochester, N. Y., a corporation of Delaware Application September 29, 1951, Serial No. 248,902

46 Claims. (Cl. 235—101)

This invention relates to a meter and more particularly to a meter for use in connection with the power unit of a mail stamping machine.

Brefly, the meter includes a series of setting levers which permit the user to select the amount of postage he desires to print. Each setting lever, when actuated, turns a setting gear mounted on the head shaft through a differential assembly. As each setting gear turns, it moves a rack longitudinally of the head shaft which in turn sets a type wheel in the printing head. Also, as each setting gear turns, it moves registering teeth on its setting assembly into operative positions. When the head shaft turns during an operating cycle, the setting gears are driven through gear trains including the differential assemblies so that the setting gears turn at the same rate as the head shaft. The registering teeth on the setting assemblies which have been moved into operative positions, actuate Geneva pinions, which act thru pinions and gear trains to register the sum being printed on the ascending and descending registers. The meter is provided with locking mechanism which locks the meter when the descending register shows an amount below the maximum amount which can be printed in one impression. Other mechanism is provided which automatically locks the setting levers in their selected positions during an operating cycle so that the setting levers may not be moved until "rest" or "home" position is reached. The descending register is so constructed that the carryover mechanism may be moved out of engagement with the counter wheels so that the descending register may be easily and quickly reset. Various interlocks are provided in the above mechanism to insure accurate operation.

One of the objects of this invention is to provide a meter for a meter mailing machine which is simple, practical and thoroughly durable. Another object is to provide a meter of the above character which may be manufactured from inexpensive materials without undue labor costs. Still another object is to provide a meter of the above character which will be light in weight. Another object is to provide a meter of the above character which will print the amount set on the setting levers and will register the sum printed. Another object is to provide a meter of the above character which will be efficient and accurate in operation. Another object is to provide a meter of the above character which is so constructed that it may be readily disassembled for purposes of repair. Still another object is to provide accurate and efficient mechanism for setting the dies on the printing head so that different types of mail may be properly stamped. A still further object is to provide a meter of the above character which will be strong and will be able to withstand the strains of continuous, hard usage. Other objects will be in part obvious and in part pointed out hereinafter.

The invention accordingly consists in the features of construction, combinations of elements and arrangements of parts, all as will be illustratively described herein, and the scope of the application of which will be indicated in the following claims.

Referring now to the drawings in which is shown one of the various possible embodiments of this invention.

Figure 7 is a staggered vertical section taken on the line 7—7 of Figure 2;

Figure 8 is a view of a portion of Figure 7 with certain parts in different relative positions;

Figure 9 is a staggered transverse section taken on the line 9—9 of Figure 7;

Figure 10 is a vertical section on an enlarged scale taken on the line 10—10 of Figure 9;

Figure 11 is a view similar to Figure 10 with certain parts in different relative positions;

Figure 12 is a vertical section taken on the line 12—12 of Figure 11;

Figure 13 is a horizontal section taken on the line 13—13 of Figure 4 showing mechanism mounted on the forward portion of the meter;

Figure 14 is a vertical section taken on the line 14—14 of Figure 13;

Figure 15 is a vertical staggered section taken on the line 15—15 of Figure 13;

Figure 15a is a vertical section taken on the line 15a—15a of Figure 15;

Figure 16 is a vertical section on an enlarged scale taken on the line 16—16 of Figure 3;

Figure 17 is a vertical transverse section on a reduced scale taken on the line 17—17 of Figure 16;

Figure 18 is a vertical section on a reduced scale taken on the line 18—18 of Figure 16;

Figure 19 is a staggered vertical section on a reduced scale taken on the line 19—19 of Figure 16;

Figure 20 is a vertical longitudinal section taken on the line 20—20 of Figure 3;

Figure 21 is a vertical transverse section on a reduced scale taken on the line 21—21 of Figure 16;

Figure 22 is a vertical transverse section on a reduced scale taken on the line 22—22 of Figure 16;

Figure 23 is a diagrammatic perspective view of the locking mechanism associated with the slogan door lock;

Figure 47 is an exploded perspective view of one of the register counter wheels;

Figure 48 is a vertical section taken on the line 48—48 of Figure 50;

Figure 49 is a vertical section taken on the line 49—49 of Figure 42;

Figure 50 is a vertical section taken on the line 50—50 of Figure 48;

Figure 51 is a vertical section taken on the line 51—51 of Figure 48;

Similar reference characters refer to similar parts throughout the several views of the drawing.

Figure 2:
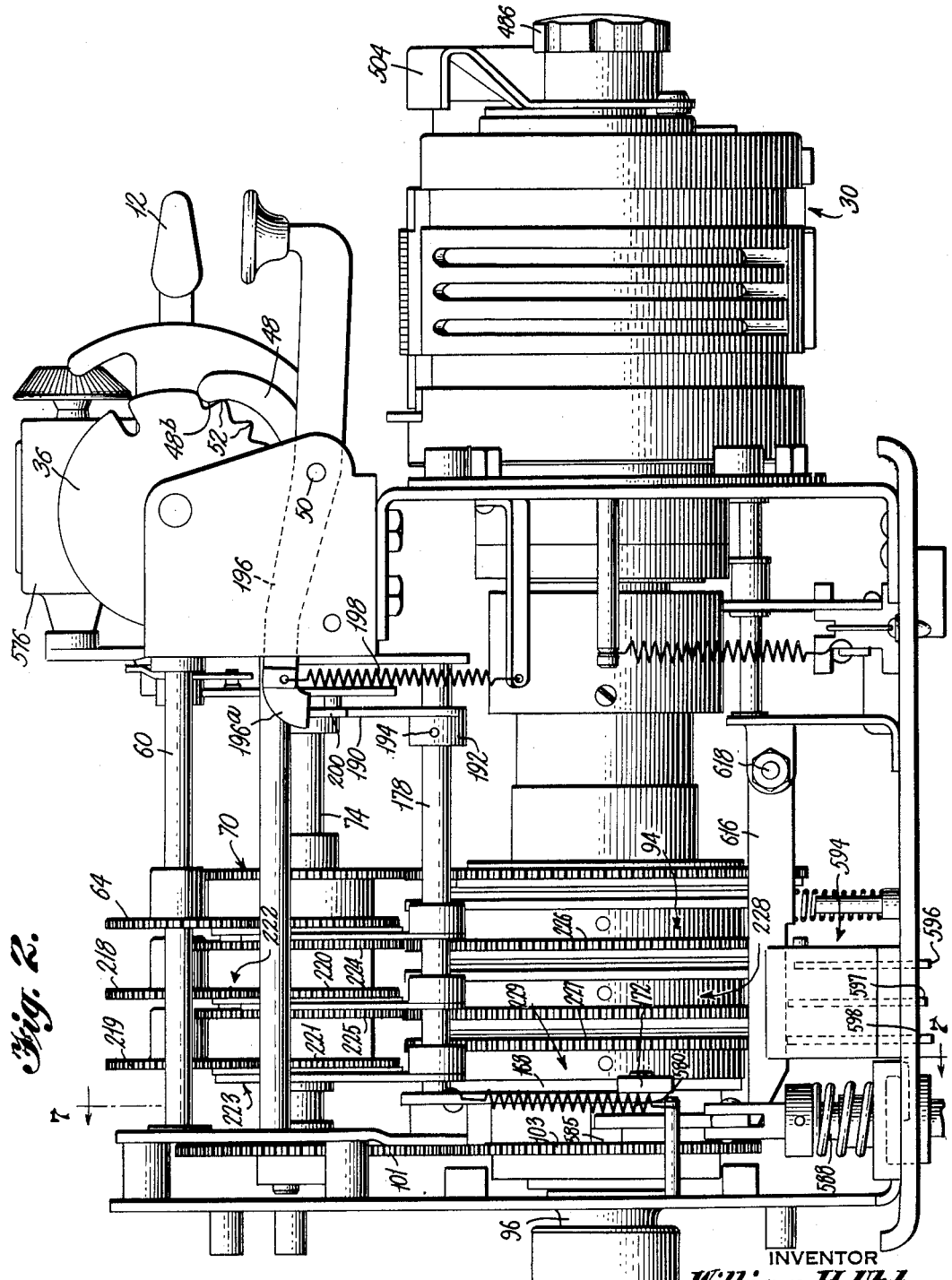
Figure 2 is a side elevation of the meter, with the housing removed, taken from the direction of the arrow 2 in Figure 3.

It might here be noted that reference hereinafter to a forward direction signifies a direction to the right as viewed in Figure 2, and that the portion of the meter adjacent the printing head will be known as the "front" portion. The printing head is mounted on a shaft which extends longitudinally on the meter. The coupling at the end of the shaft opposite that on which the printing head is mounted, is mounted on the "rear" end of the head shaft. A direction at right angles to the axis of the head shaft will be known as a "transverse" direction. A direction upwardly from the bottom of the meter refers to an "upward" direction, while a direction opposite thereto will be known as a "downward" direction.

Figure 1:
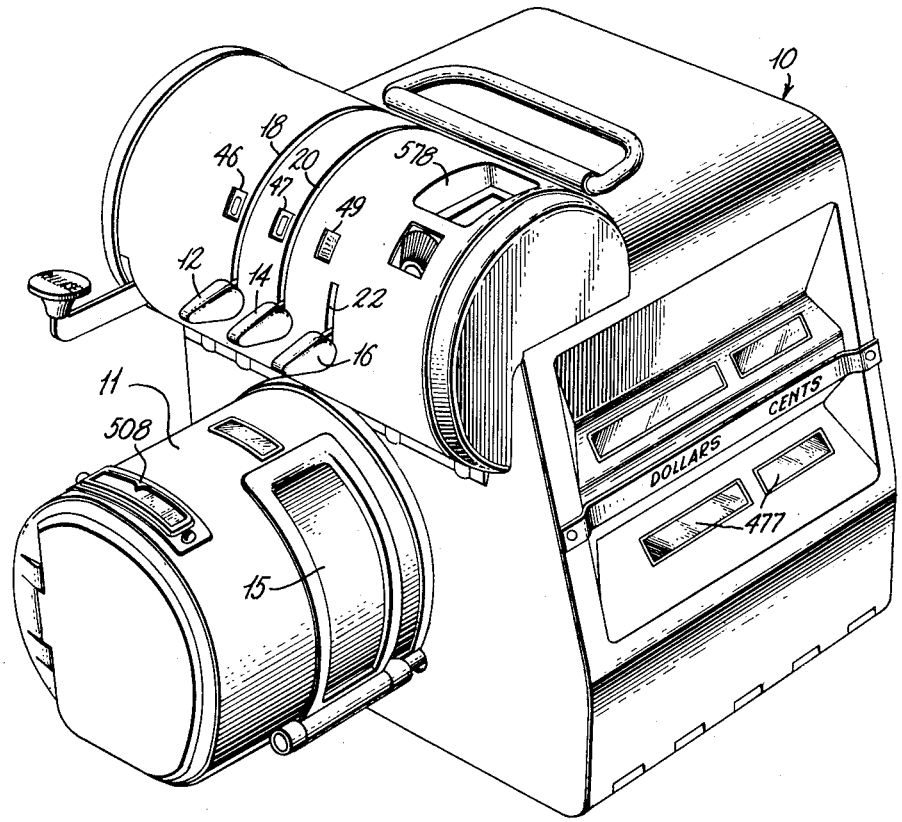
Figure 1 is a perspective view of the meter.

The meter shown in Figure 1 may be used in conjunction with a power unit of the type shown in Figure 1 of Patent No. 2,373,503. The mail is fed into printing position by conveyor belts mounted on the power unit, and each letter strikes a trip which causes mechanism on the power unit to drive the head shaft of the meter through one cycle, which, in the present type meter, means one revolution of the head shaft. During the cycle of operation, type wheels mounted on the printing head of the meter print the amount selected by the user on the letter in printing position. The sum printed is registered on the ascending and descending registers in the meter during the same operating cycle.

Figure 5:
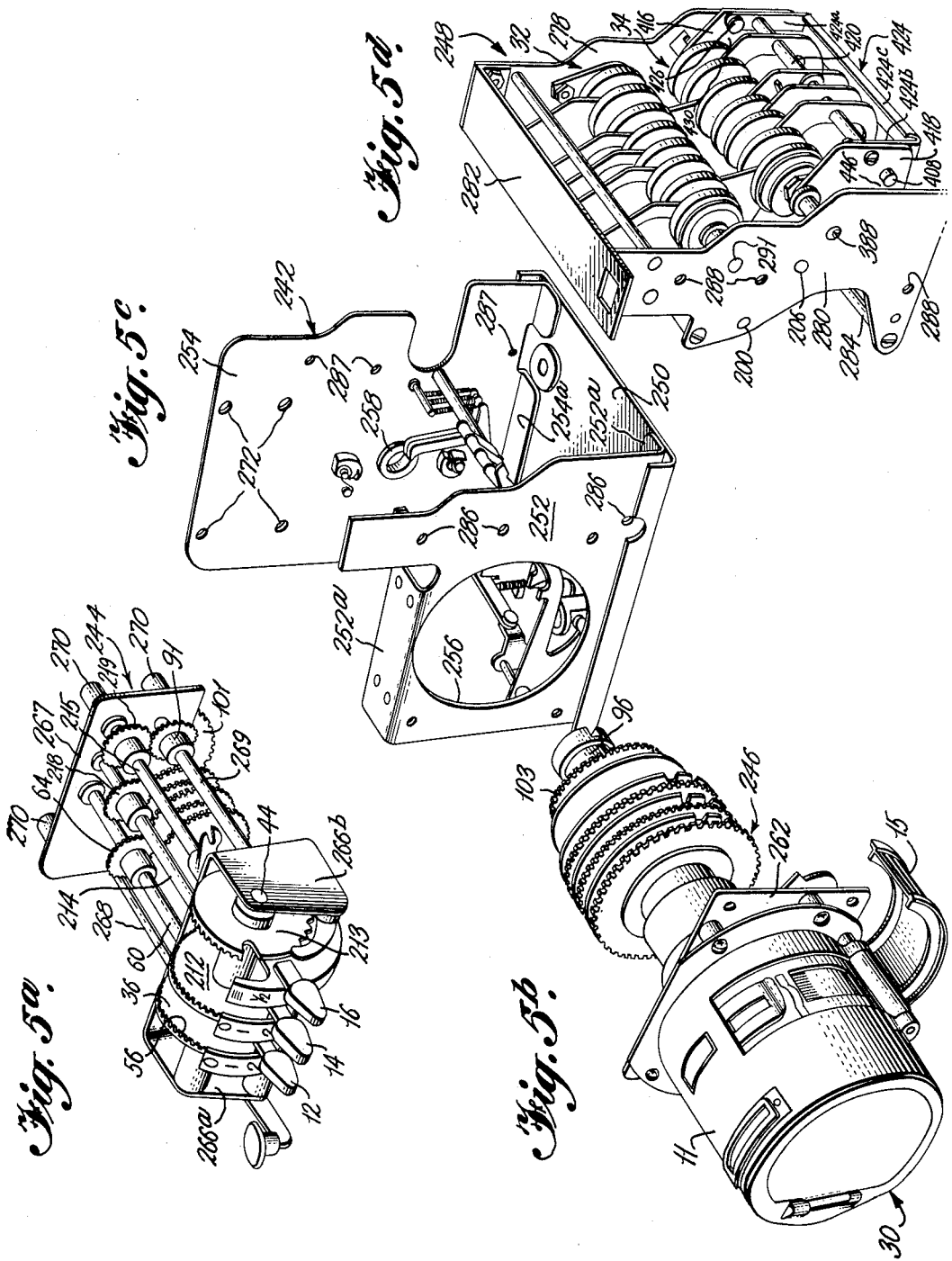
Figure 5a is a perspective view of the setting assembly of the meter.
Figure 5b is a perspective view of the headshaft assembly of the meter.
Figure 5c is a perspective view of the main framework of the meter and parts mounted thereon.
Figure 5d is a perspective view of the registering assembly of the meter.

In general, referring to Figure 1 the meter is enclosed in a housing, generally indicated at 10, which is secured and sealed to the framework of the meter. The housing encloses the mechanism of the meter and thus prevents tampering. A series of setting levers, 12, 14, and 16, extend through housing 10 and are positioned in slots 18, 20 and 22. The user by moving levers 12, 14 and 16 longitudinally of the slots 18, 20 and 22, sets the type wheels 24, 26 and 28 (Figures 28 and 33) which are mounted on the printing head 30. At the same time that the type wheels are set, mechanism is conditioned so that during an operating cycle the sum being printed by the type wheels is registered on the ascending and descending registers, generally indicated at 32 and 34 (Figure 5d). Thus, each time a letter actuates the trip on a power unit the head shaft of the meter is driven through a single revolution, a stamp is printed, and the amount of the stamp is registered.

Each setting lever has a train of mechanism associated with it, connecting it to related counter wheels in the ascending and descending registers, and to a related type wheel in the printing head. Thus, lever 16, which is the half cent lever, is connected to a type wheel capable of printing a half cent and to the two counterwheels capable of registering half cents. Setting lever 14 is connected to the cents type-wheel and cents counterwheels, while setting lever 12 is connected to the tens of cents type wheel and counterwheels. Thus, this meter is capable of printing a stamp having a value of anywhere from "½¢" to "99½¢." As each train of mechanism connecting each setting lever to its related type wheel and register counterwheels is substantially similar, each train of mechanism will be called a "bank." Each bank is independent of the other banks and may be actuated by its setting lever to independently set its type wheel and to register the sum being printed by its type wheel during an operating cycle. The present meter has three banks and is so designed that two more banks may be added to it.

Figure 4:
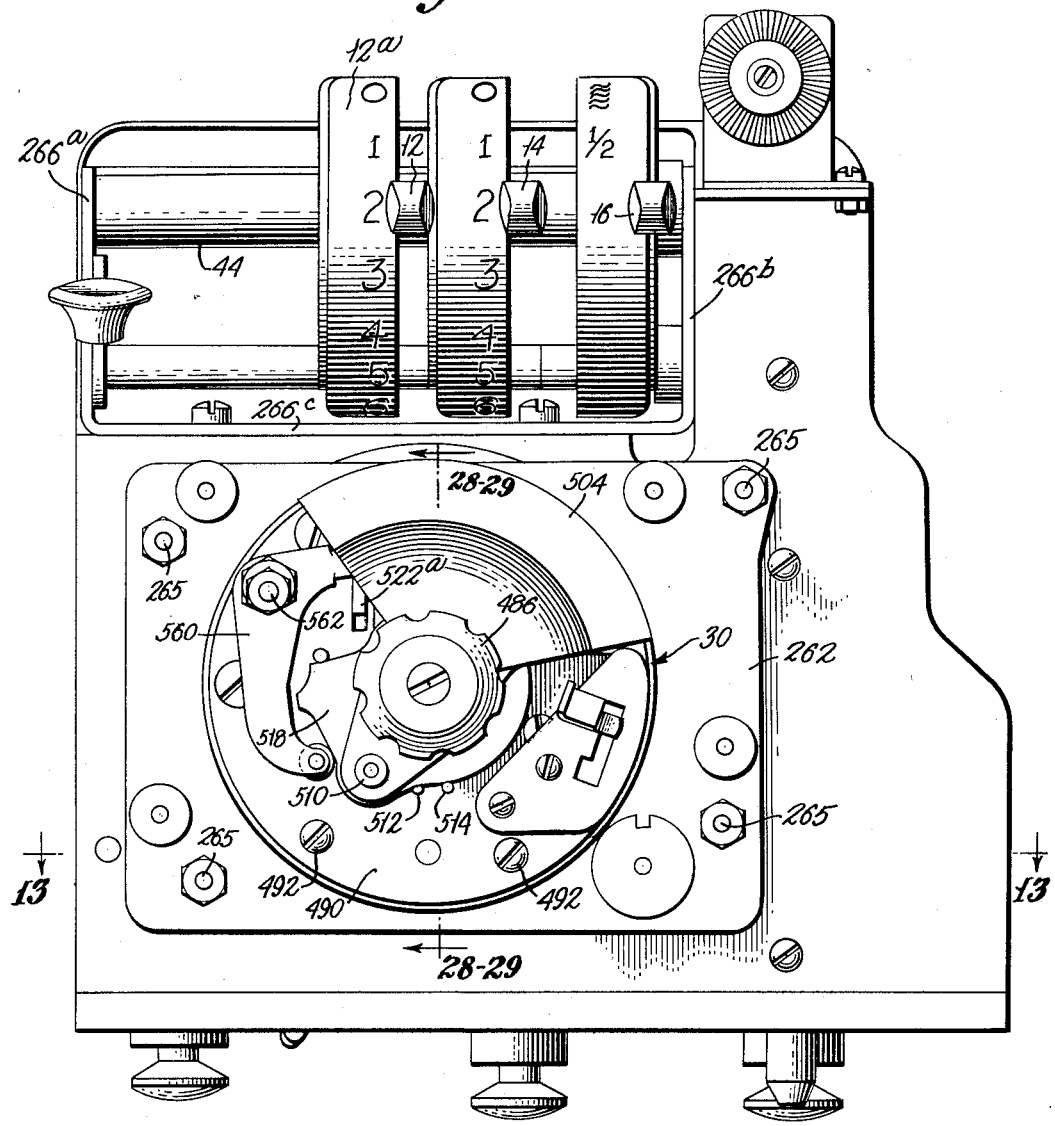
Figure 4 is a front elevation of the meter taken from the direction of the arrow 4 in Figure 3 with the housing removed.

As pointed out hereinabove, as all of the banks are substantially similar in construction, and as each bank operates as an individual train of mechanism, detailed description of a bank will be limited to the bank actuated by setting lever 12. Setting lever 12 (Figure 6) is secured to a setting gear and detent plate 36 by rivets 38 and 40. The hub 43 of setting gear 36 is rotatably mounted on a shaft 44, which extends transversely across the meter (Figure 5a). Setting lever 12 includes a sector having a cylindrically shaped segmental dial flange 12a (Figure 6) which carries digits from zero to nine (Figure 4). A window 46 (Figure 1) in housing 10 is provided thru which the digits on flange 12a (Figure 6) may be viewed. Thus, as setting lever 12 is moved arcuately in slot 18 (Figure 1) each digit on flange 12a is successively visible through window 46. The digit visible thru window 46 indicates the setting of setting lever 12.

Figure 6:
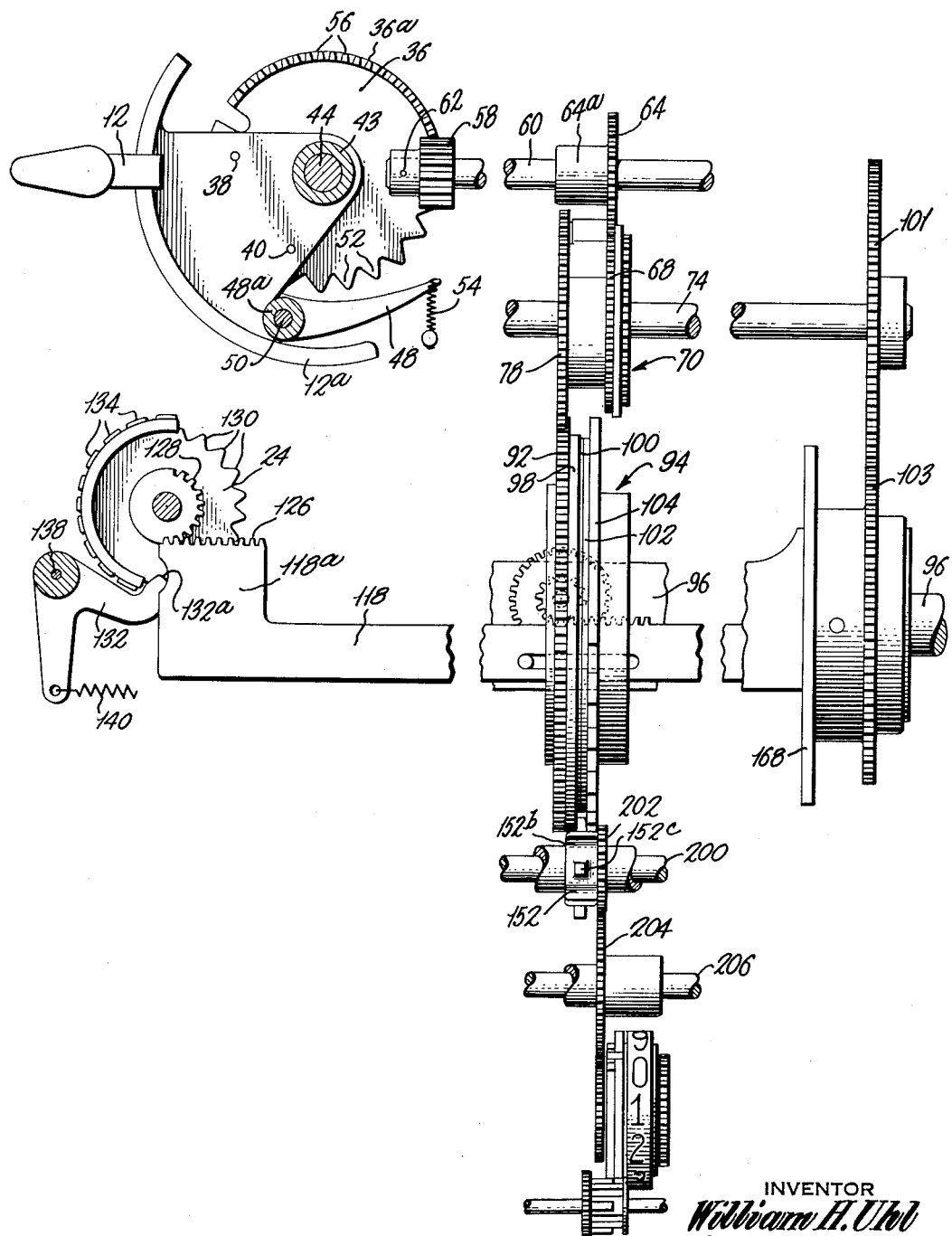
Figure 6 is a diagrammatic showing in elevation of one of the banks of the meter.

To insure proper alignment of the digits with window 46 (Figures 6 and 20) a detent 48 is provided. Detent 48 is pivotally mounted by its hub 48a on a shaft 50 (Figures 2, 6 and 20), which extends transversely across the meter. The nose 48b (Figures 2 and 20) of detent 48 is aligned with ratchet teeth 52 on the edge of setting gear and detent 36 and is held in engagement with teeth 52 by means of a spring 54 (Figure 6).

The edge of plate 36 opposite to teeth 52 is provided with a cylindrically shaped flanged portion 36a (Figure 3) having gear teeth 56 formed thereon. These teeth mesh with a pinion 58 (Figure 6) which is mounted on and pinned to a setting lever shaft 60 by means of a pin 62. Setting lever shaft 60 is rotatably mounted on the framework of the meter (Figures 3 and 6) and has a gear 64 mounted thereon by means of its hub 64a and pinned thereto by means of pin 66.

Figure 24:
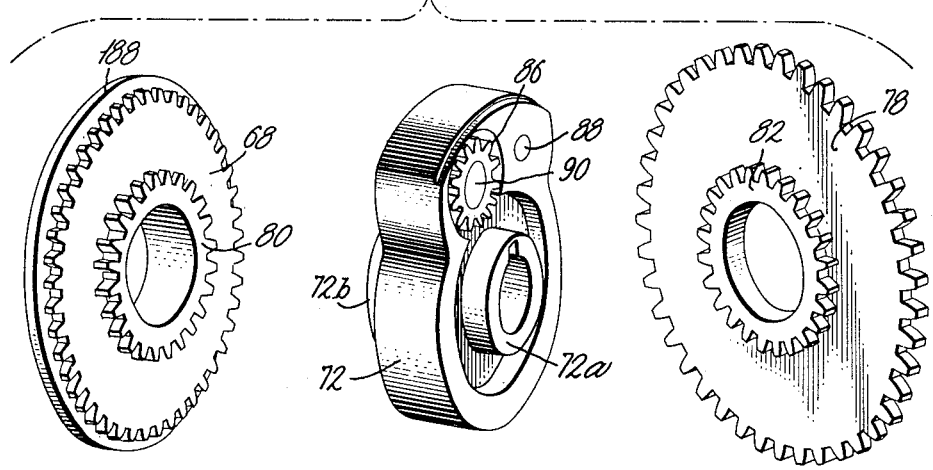
Figure 24 is an exploded perspective view of one of the differential assemblies.
Figure 25:
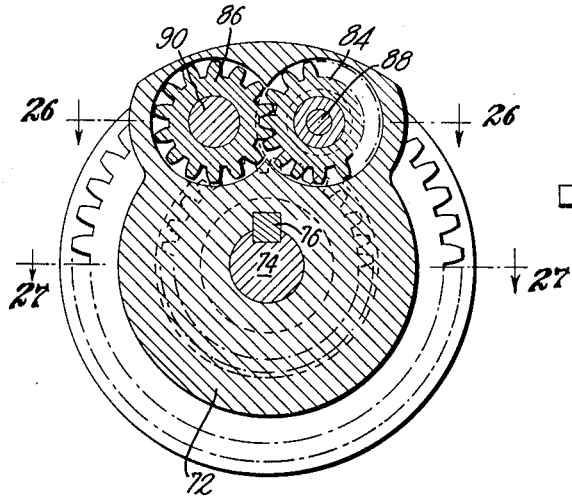
Figure 25 is a vertical transverse section on a reduced scale taken on the line 25—25 of Figure 16.
Figure 26:
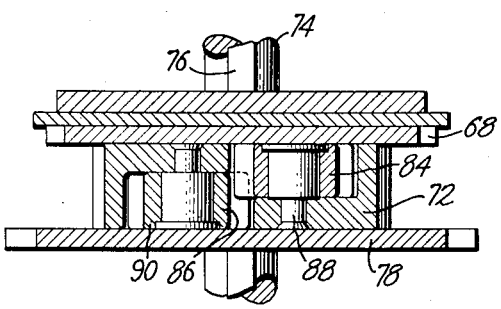
Figure 26 is a horizontal section taken on the line 26—26 of Figure 25.
Figure 27:
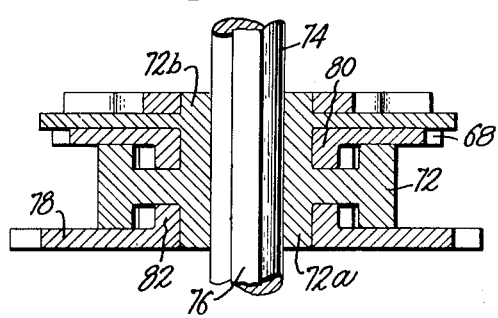
Figure 27 is a horizontal section taken on the line 27—27 of Figure 25.

Gear 64 meshes with and turns a gear 68 forming a part of the differential assembly, generally indicated at 70. The elements of the differential assembly 70 are mounted on a support 72 (Figure 24) which is keyed to a shaft 74 (Figures 6 and 25) by means of key 76. Support 72 has hub portions 72a and 72b (Figures 16 and 24) on which gears 68 and 78 are mounted. Sun gears 80 and 82 are connected to gears 68 and 78 and mesh with differential pinions 84 and 86 (Figure 26). Pinions 84 and 86 are in meshing engagement with each other and are mounted on stud shafts 88 and 90, which are in turn mounted on support 72. When shaft 74, and thus support 72 (Figures 24 and 25) is held stationary, and setting gear 68 is turned by the train of mechanism connecting it to the tens setting lever 12, setting gear 68 drives pinion 84 through sun gear 80 (Figures 24 and 26). Pinion 84 drives pinion 86, which in turn drives sun gear 82 and setting gear 78. When the setting gear 68 is held stationary and shaft 74 (Figure 16) is rotated, then pinion 84 runs on sun gear 80 and drives pinion 86 (Figures 24) as it turns. Pinion 86 in turn drives sun gear 82, which drives setting gear 78 for purposes to be disclosed more fully hereinafter.

Figure 36:
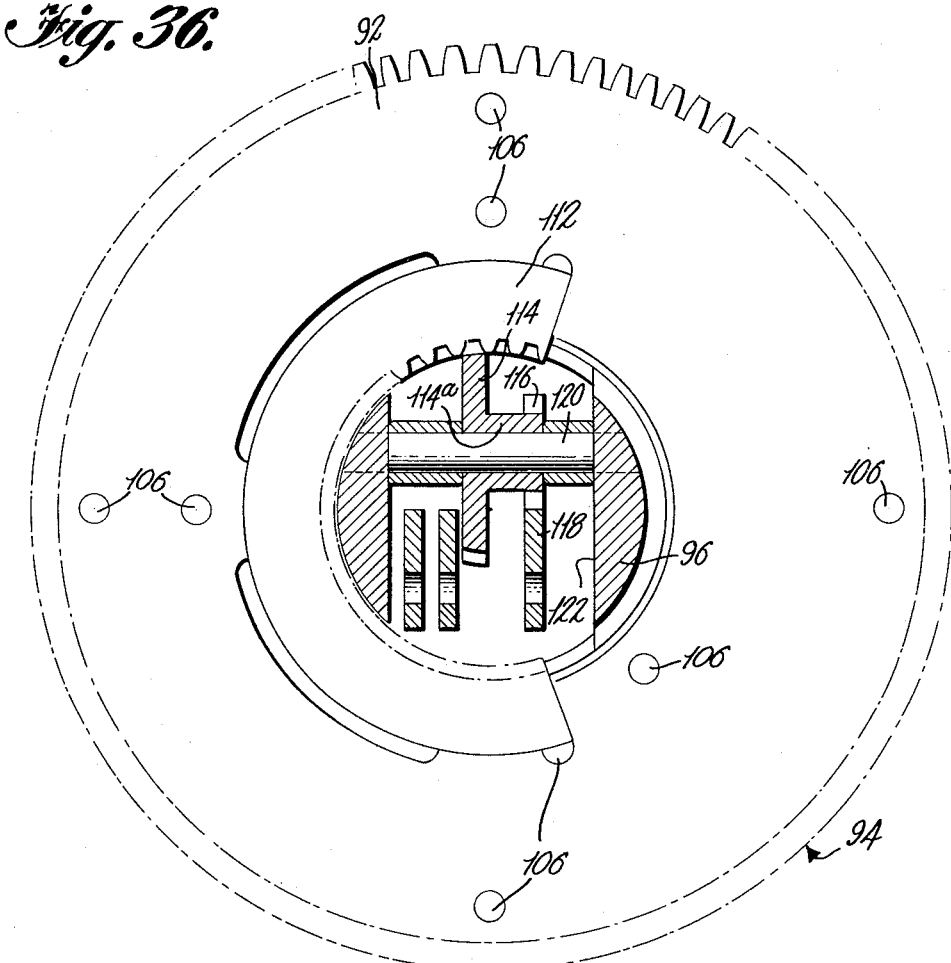
Figure 36 is a vertical section taken on the line 36—36 of Figure 29.
Figure 37:
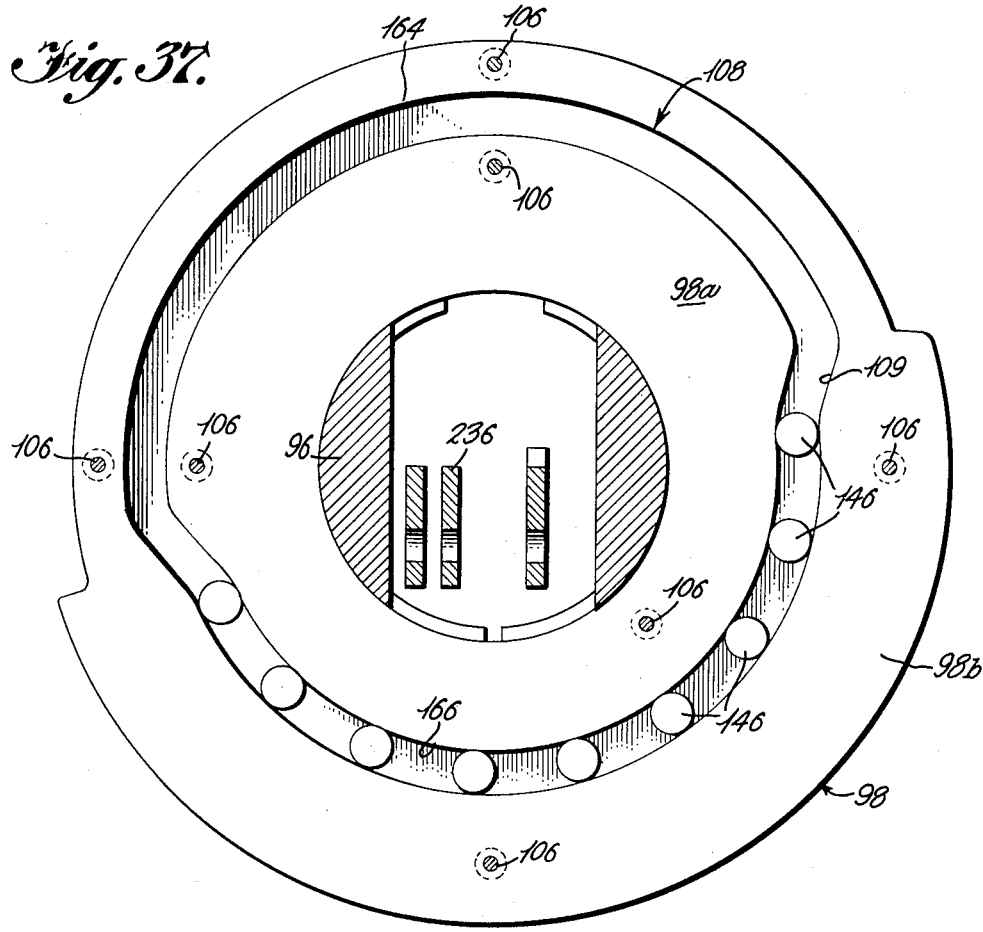
Figure 37 is a vertical section taken on the line 37—37 of Figure 29.
Figure 38:
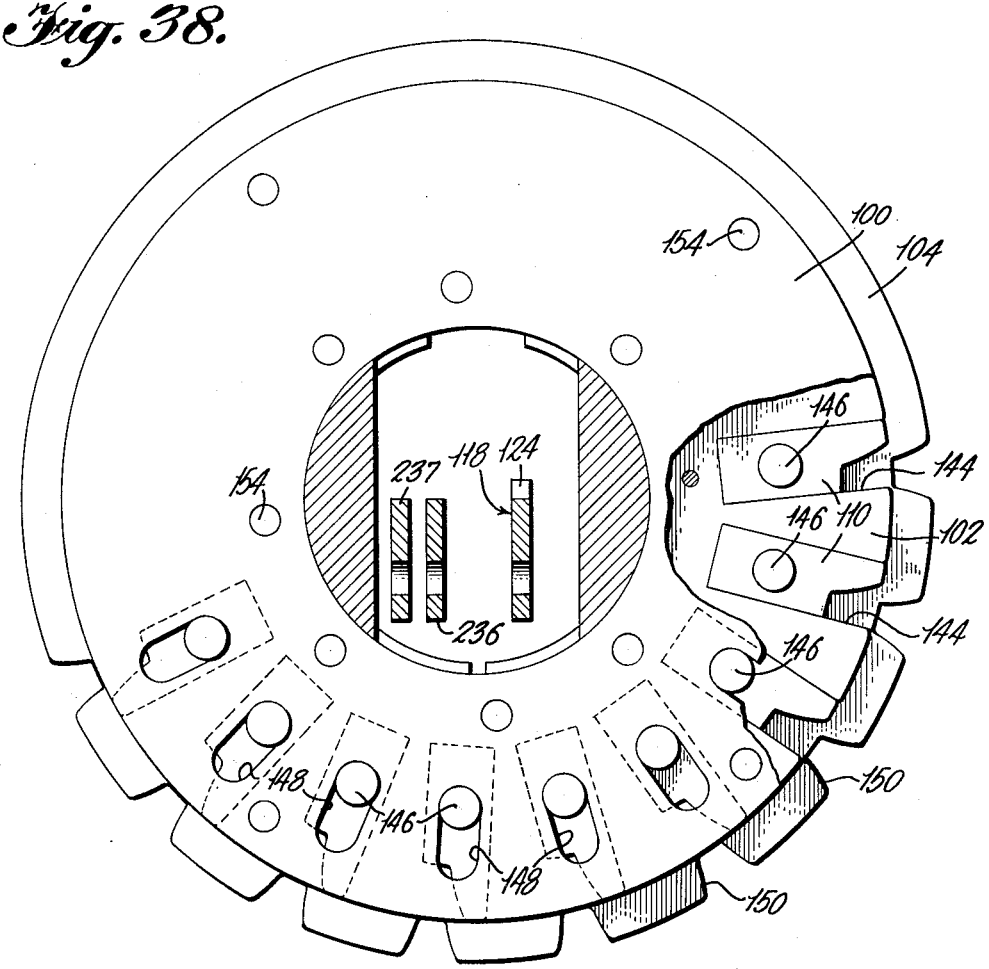
Figure 38 is a vertical section taken on the line 38—38 of Figure 29.

When the tens type wheel is being set, differential setting gear 78 turns a setting gear 92 (Figure 6), forming a part of the setting assembly, generally indicated at 94. Assembly 94 is mounted on a head shaft 96. This setting assembly is substantially similar to the setting assemblies shown and described in Patent No. 2,482,935. In addition to setting gear 92, assembly 94 includes a cam disc, generally indicated at 98 (Figure 37), a retaining disc, generally indicated at 100 (Figure 38), a Geneva tooth guide disc 102 (Figures 38 and 39) and a Geneva disc 104. The setting assembly 94 comprises two sections, the first of which includes setting gear 92 and cam disc 98 (Figures 36 and 37), while the other section includes retaining disc 100 (Figure 38), Geneva tooth guide disc 102, and Geneva disc 104 (Figure 40). During setting the first section (Figure 1) rotates with respect to the second as setting gear 92 is turned by setting gear 78. The two parts 98a and 98b of cam disc 98 (Figure 37) are connected to gear 92 (Figure 36) by means of rivets 106, thus forming a cam slot 108. This cam slot acts upon pins 146 on teeth 110 (Figures 37 and 38) to move the teeth successively into registering position during the setting operation. The number of teeth moved into operative position depends on the amount the first section of the setting assembly is rotated with respect to the second section.

Figure 28:
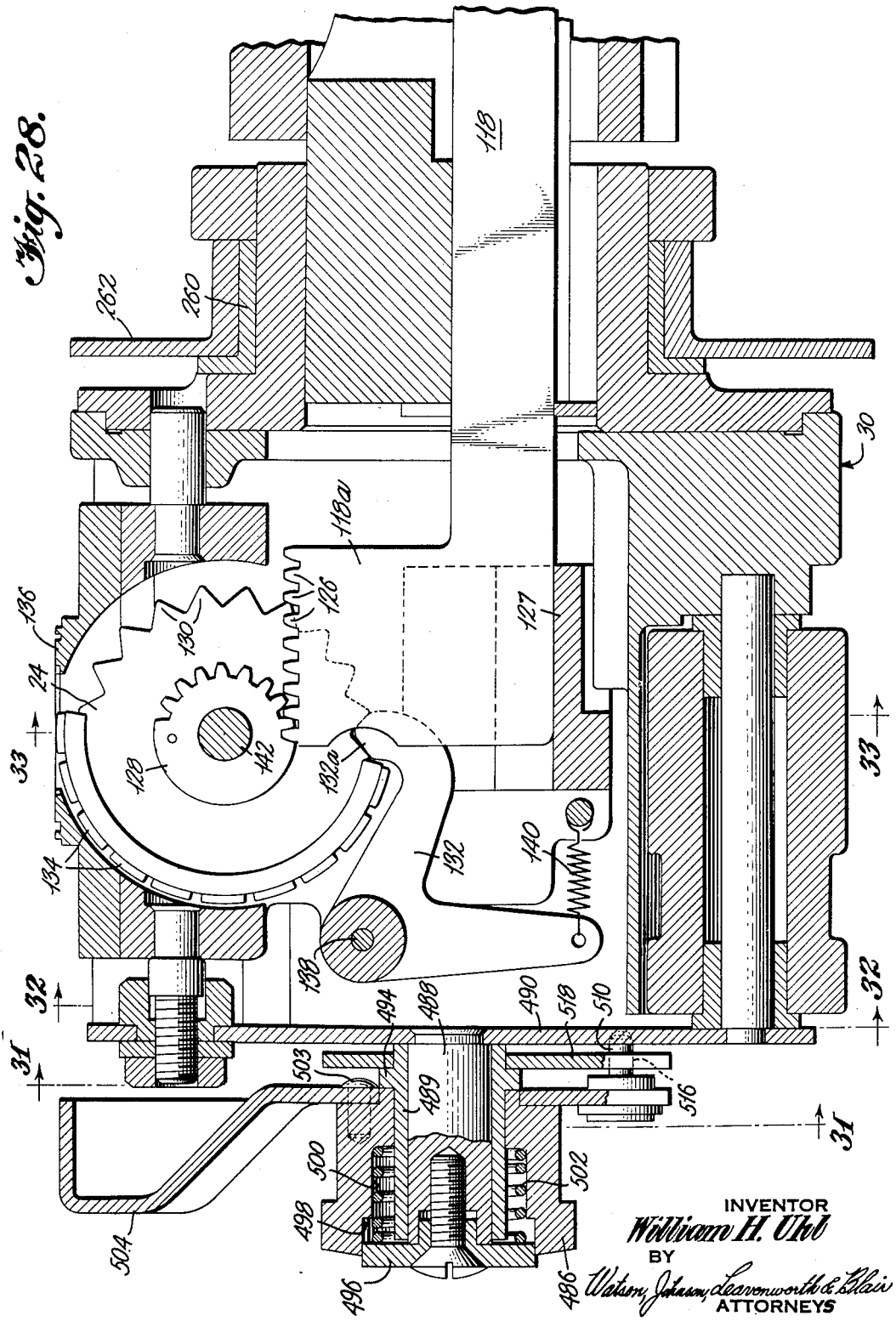
Figure 28 is a vertical section on an enlarged scale of the forward half of the meter taken on the line 28—28 of Figure 4.

Setting gear 92 (Figure 36) is provided with a helical gear segment 112 which acts through connected gears 114 and 116 to move rack 118 (Figures 28 and 29) longitudinally of the head shaft 96 to set type wheel 24 (Figure 28). Helical gear segment 112 (Figure 36) is secured to setting gear 92 in any suitable manner and its teeth act upon the helical gear teeth of gear 114, the hub 114a of which is mounted on a shaft 120 extending transversely across a slot 122 which extends longitudinally of head shaft 96. The hub 114a of gear 114 connects gear 114 to gear 116. When setting gear 92 is turned, segment 112 acts upon and turns helical gear 114. Helical gear 114 drives gear 116, the teeth of which mesh with teeth 124 (Figure 29) formed on rack 118. Rack 118 (Figures 28, 29 and 30) is mounted for sliding movement longitudinally of the axis of head shaft 96 on pin 125 (Figure 29) and support 127 (Figures 28 and 33), and the forward end of rack 118 has an upwardly extending portion 118a having a rack 126 (Figure 28) formed thereon. This rack meshes with a gear 128 connected to type wheel 24 which is rotatably mounted on shaft 142. Type wheel 24 is provided with a series of ratchet teeth 130, which co-act with a pawl 132 to properly align each digit 134 of the raised type on the type wheel with respect to stamp die 136. Pawl 132 is pivotally mounted on a shaft 138 and its nose 132a is held in engagement with teeth 130 by means of spring 140. Thus, whenever the setting gear 92 (Figure 29) is turned by the setting lever associated therewith, the train of mechanism connecting said gear 92 with type wheel 24 (Figure 28) turns type wheel 24 to the setting at which the operator sets the setting lever.

At the same time the type wheel is being set, the Geneva teeth on the rear section of setting assembly 94 (Figure 6) are being set so that they will register the same digit that is set on type wheel 24 during the operating cycle. Retaining disc 100, guide disc 102 and Geneva disc 104 (Figures 6 and 38) are connected together by means of rivets 154 and connected to segments 156, 158 (Figure 40), which are connected to head shaft 96 by means of taper pins 160, 162. Thus, the rear section of setting assembly 94 turns with head shaft 96 during each operating cycle.

The teeth 110 (Figure 38) are mounted in slots 144 in guide disc 102 for sliding movement radially with respect to the guide disc 102. Teeth 110 are provided with pins 146 which extend through oval openings 148 in retaining disc 100. Pins 146 extend into cam slot 108 (Figure 37) in the other section of the setting assembly 94 when setting assembly 94 (Figure 29) is assembled. It will be noted that cam slot 108 includes a section having a large radius 164 (Figure 37) and a section having a small radius 166. During the setting operation the head shaft 96, and thus the registering section of setting assembly 94 (Figure 29) is held stationary. When the setting gear 92 turns, the cam slot 108 (Figure 39) turns with respect to teeth 110 and the section 109 of the cam slot (Figures 37 and 39) acts upon pins 146 to move the teeth 110 into registering position. If the setting lever is moved one digit, one tooth is moved into registering position, and if the setting lever is moved nine digits, nine teeth are moved into registering position. Geneva disc 104 has a plurality of notches 150 in its periphery, which are positioned adjacent teeth 110. These notches receive the axially long or wider teeth 152b of Geneva pinion 152 (Figure 39) during registration of the sum being printed, as will be pointed out more fully hereinafter. Axially short or narrower teeth 152c intervene wider teeth 152b (Figure 6 and 39).

Figure 3:
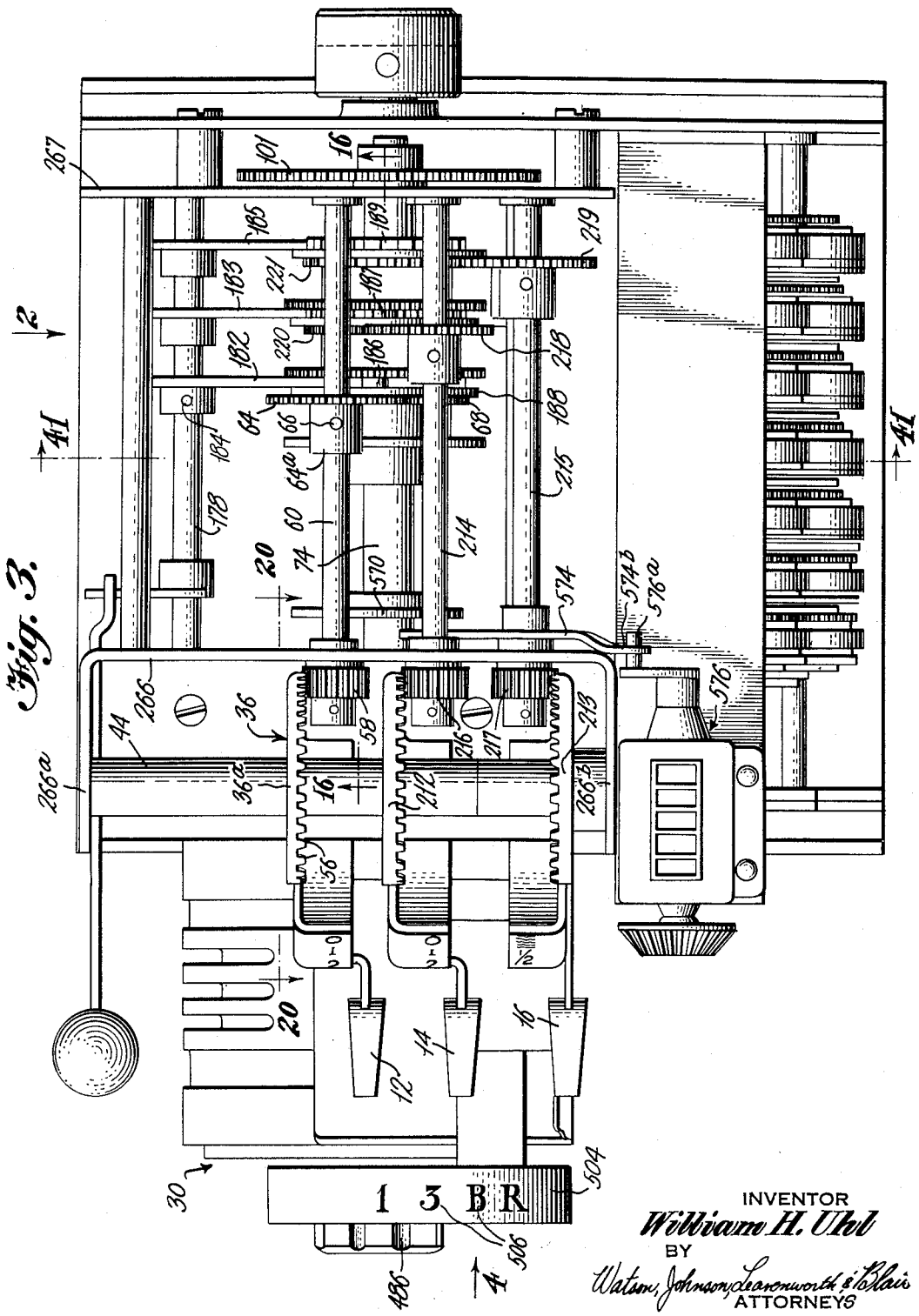
Figure 3 is a top plan of the meter with the housing removed.
Figure 29:
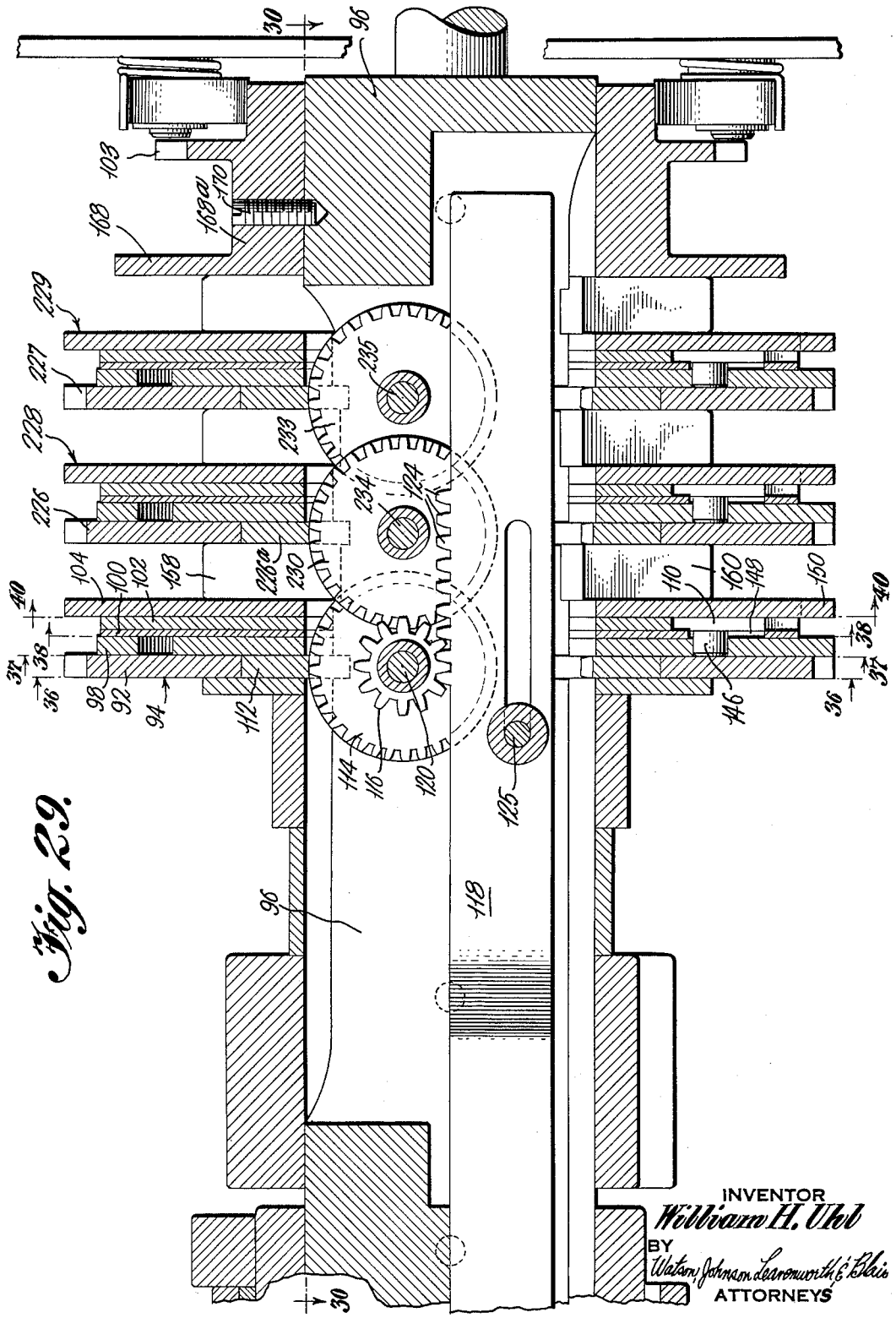
Figure 29 is a vertical section on an enlarged scale of the rear portion of the meter taken on the line 29—29 of Figure 4.
Figure 30:
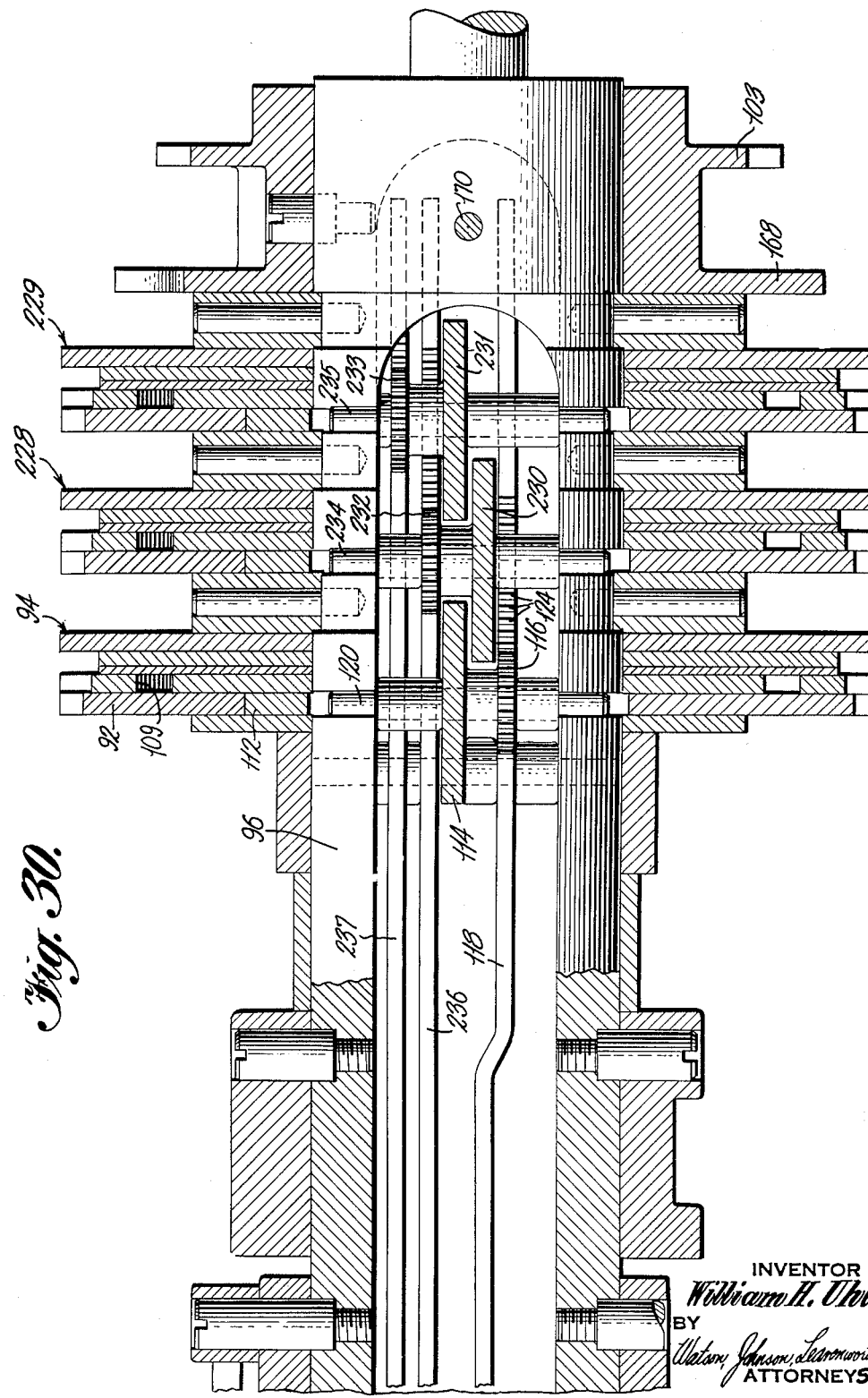
Figure 30 is a horizontal section taken on the line 30—30 of Figure 29.

In order to insure correct alignment of the mechanism in each bank so that the figure at which a setting lever is set will be printed and registered, aligning mechanism is provided. This mechanism is inoperative when the machine is in "home" position, and becomes operative as soon as the head shaft begins to turn. The aligning mechanism is actuated by a disc 168 (Figures 19 and 29). The hub 168a (Figure 29) of disc 168 is connected to shaft 96 by means of a set screw 170. Disc 168 (Figure 19) has a recess 176 in its periphery adapted to receive a roller 172. Roller 172 is rotatably mounted on an arm 174 pinned to a shaft 178 rotatably mounted on and extending longitudinally of the meter (Figures 3 and 19). A spring 180 is connected to a portion 174a of arm 174 and exerts a resilient pull at all times upon portion 174a of arm 174 tending to turn arm 174 in a counter-clockwise direction. Thus spring 180 holds roller 172 in engagement with the periphery of disc 168 and causes it to enter recess 176.

A detent 182 is mounted on shaft 178 (Figures 3 and 19) and is connected thereto by means of pin 184. The nose portion 182a (Figure 21) of detent 182 co-acts with a toothed aligner disc 186 connected to a disc 188 (Figures 3, 16 and 24) which is in turn connected to and rotates with setting gear 68. Aligner disc 186 is provided with nine teeth, as is best shown in Figure 21, thus providing nine notches 186a into which the nose 182a of detent 182 may enter. After setting has taken place, and head shaft 96 (Figure 29) begins to turn, disc 168 acts upon roller 176 (Figure 19) to move detent actuating arm 174 in a clockwise direction. This turns shaft 178 in a clockwise direction causing the nose 182a of detent 182 (Figure 21) to enter one of the notches in aligner disc 186. Because disc 186 (Figure 16) is connected to gear 68, nose 182a (Figure 21) aligns the setting gear 68 (Figure 22) of the differential, which in turn acts through the differential and setting assemblies so that the type wheel in the printing head and the registering teeth of the setting assembly are correctly positioned to print and register the digit at which the setting lever is set.

Figure 39:
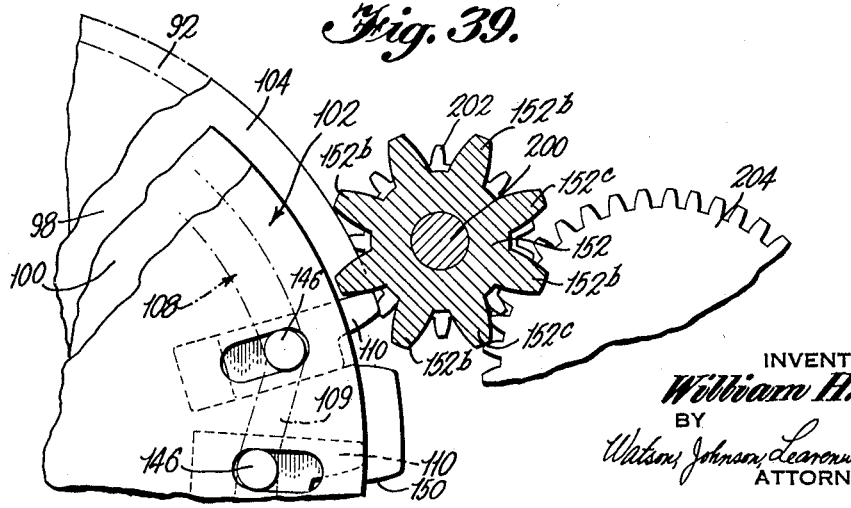
Figure 39 is a view of a portion of the setting assembly shown in Figure 38, illustrating its relation to certain other parts of the meter.
Figure 40:
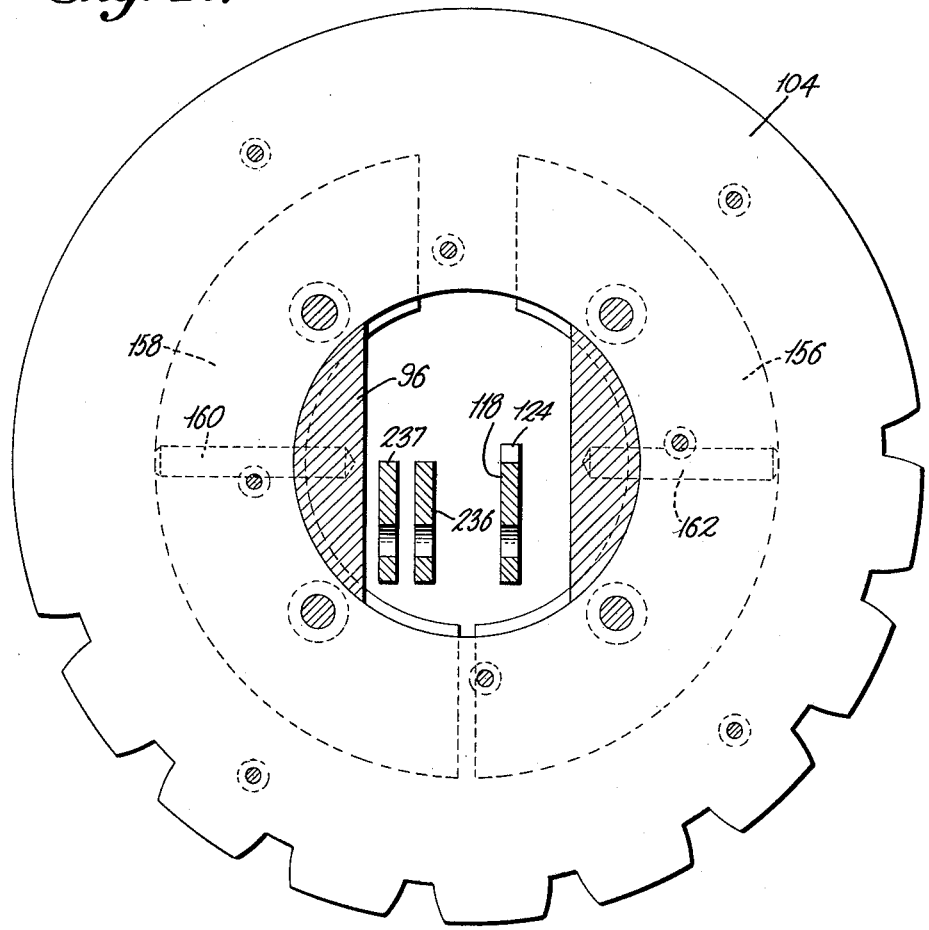
Figure 40 is a vertical section taken on the line 40—40 of Figure 29.

To register the sum being printed by type wheel 24 (Figures 6 and 28), the registering section of setting assembly 84 (Figure 29) turns Geneva gear 152 (Figures 6 and 39). Geneva gear 152 is turned by the sliding teeth 110 (Figure 38) which have been moved radially into operative position relative to narrow teeth 152c of the former during the setting operation, each sliding tooth turning the Geneva gear one quarter of a turn. The wide teeth 152b of the Geneva gear 152 which ride on the edge of disc 104 when the Geneva gear is not rotated, as best understood from Figure 39, move into the notches 150 positioned clockwise of sliding teeth 110 when one of the latter engages one of the narrow teeth 152c of the Geneva gear to rotate the latter. Geneva gear 152, which is mounted for free rotation on shaft 200 (Figures 6, 39 and 41), has a gear 202 connected to it. Gear 202 drives an idler gear 204 which is rotatably mounted on shaft 206. Idler gear 204 (Figure 41) meshes with and drives gears which actuate the tens counterwheels 208 and 210 on the descending and ascending registers 32 and 34. These counterwheels are parts of differential registers operating in a manner similar to the differential registers in Patent No. 2,482,935.

Figure 42:
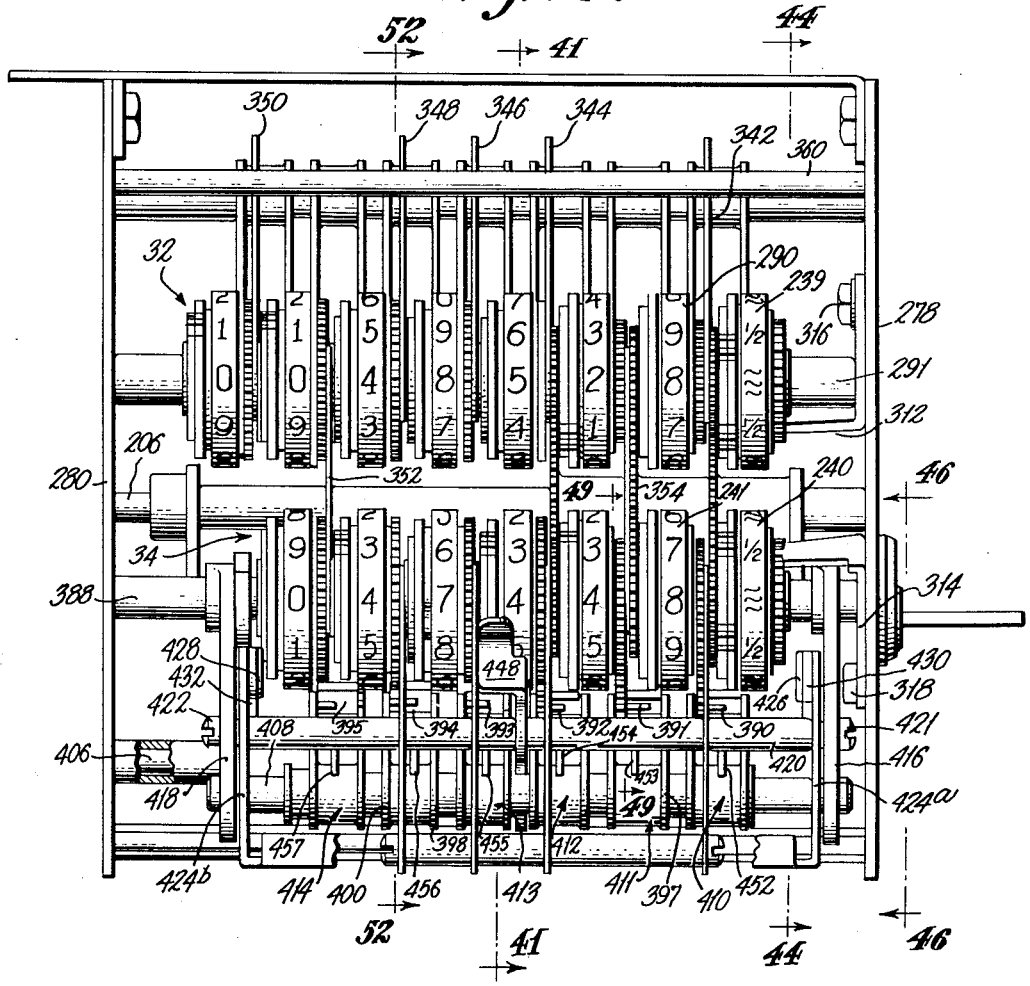
Figure 42 is a side elevation of the registering section of the meter taken from the right hand side of Figure 5d.

Each of the other setting levers 14 and 16 (Figure 1) are connected to banks having similar mechanism to that described with respect to setting lever 12. These setting levers 14 and 16 respectively turn setting gears and detent plates 212 and 213 (Figure 3) which turn shafts 214 and 215 thru pinions 216 and 217. Gear 218 (Figures 2 and 3) connected to shaft 214 acts upon and turns gear 220 of differential assembly 222 (Figures 2 and 16). Gear 219 which is mounted on and connected to shaft 215 meshes with an idler gear 91 (Figure 5a) which is in mesh with gear 221 (Figure 2), of differential assembly 223. The differential assemblies 222 and 223 include the same mechanism as differential assembly 70 and are mounted on shaft 74. Gears 224 and 225 (Figure 16) of differential assemblies 222 and 223 drive the setting gears 226 and 227 of the setting assemblies, generally indicated at 228 and 229 (Figures 2 and 29), which are similar in construction to setting assembly 94. Setting assemblies 228 and 229 are mounted on head shaft 96 and act thru gears 230 and 232 (Figure 30) and gears 231 and 233 rotatably mounted on head shaft 96 by shafts 234 and 235 to move racks 236 and 237 longitudinally of the head shaft. Racks 236 and 237 (Figure 33) set type wheels 26 and 28 in the same manner as rack 118 sets type wheel 24. The registering sections of setting assemblies 228 and 229 (Figure 30) act thru Geneva gears 376 and 378 (Figure 43) to register the digits being printed by each bank on the ascending register counter wheels 239 and 290 and on descending register counterwheels 240 and 241 (Figure 42).

Figure 33:
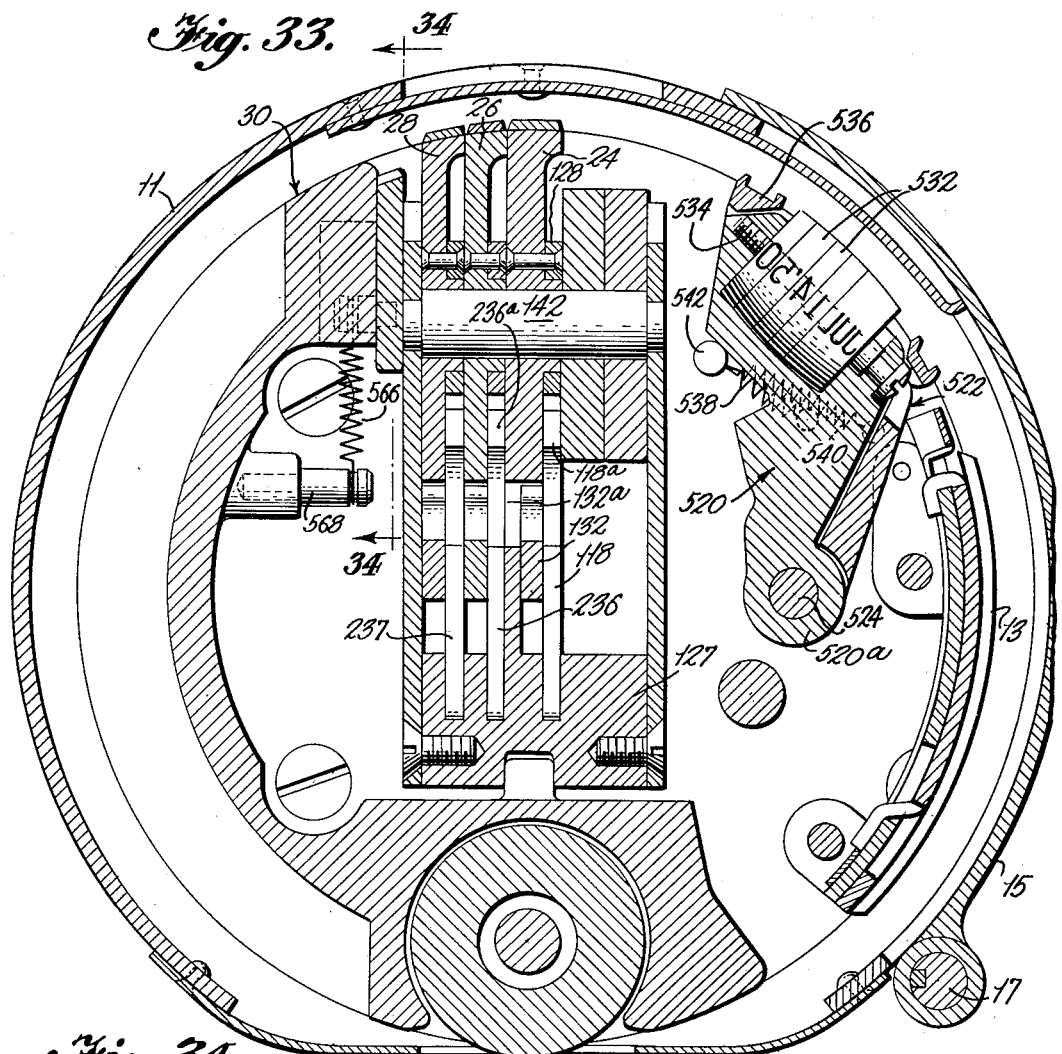
Figure 33 is a vertical section taken on the line 33—33 of Figure 28.

When the head shaft 96 turns, the setting assemblies turn with it. Also, during an operating cycle the aligning detents 182, 183 and 185 (Figures 3, 19 and 21) engage and lock the aligner discs 186, 187 and 189. This locks the setting levers 12, 14 and 16 (Figure 1) in their set positions during an operating cycle. If the setting sections of the setting assemblies turn with respect to the registering sections, then the number of teeth 110 (Figure 38) in registering position will change as well as the position of type wheels 24, 26 and 28 (Figure 33). To prevent this the differential assembly shaft 74 (Figure 16) is driven thru a gear 101 the hub of which is pinned by pin 105 to the rear end of shaft 74. Gear 101 is driven by a gear 103 (Figure 2) which is connected to the rear end of head shaft 96. As was described hereinabove the differential assemblies are keyed to shaft 74 (Figure 16), and thus gear 103 drives the portions of the differential assemblies not held by the aligner detents during each cycle of operation. The gear ratio between gears 101 and 103 is such that the setting gears 78, 224 and 225 of the differential assemblies drive the setting gears 92, 226 and 227 of the setting assemblies (Figure 16) at exactly the same rate of rotation as head shaft 96. Thus, the setting of the setting assemblies cannot change during a cycle of operation.

To aid in assembling the meter and also with particular reference to servicing or repairing the meter, the meter is built so that it may be separated into four separate units. These units include a main framework, generally indicated at 242 (Figure 5c), a setting unit generally indicated at 244 (Figure 5a, a head shaft unit, generally indicated at 246 (Figure 5b), and a registering unit, generally indicated at 248 (Figure 5d). The framework includes a base plate 250, a front plate 252 and a rear plate 254. The front and rear plates 252 and 254 have flange portions 252a and 254a, which are secured to base plate 250 in any suitable manner. Front plate 252 is provided with an opening 256 thru which the head shaft and parts mounted thereon are passed when the machine is being assembled. The head shaft is rotatably mounted on a bearing 258 on rear plate 254 and on a bearing 260 (Figure 28) which is mounted on supporting plate 262 (Figure 5b). Supporting plate 262 is connected to front plate 252 by means of nuts and bolts 265 (Fig. 4).

The setting unit 244 (Figure 5a) includes a front plate 266 and rear plate 267 connected by rods 268 and 269. Plate 266 has forwardly extending flange portions 266a and 266b which support shaft 44 on which the setting gears and detent plates 36, 212 and 213 (Figure 3) are rotatably mounted. Plates 266 and 267 have bearings on which shafts 60, 214, 215, 178 and 74 (Figures 2 and 3) are rotatably mounted. As the differential assemblies are mounted on shaft 74, the gears from the setting levers to the setting gears of the differential assemblies remain in meshing engagement when the setting unit is removed from the machine. Plate 266 includes a third flange portion 266c (Figure 4) which is connected to the lower edges of flange portions 266a and 266b. When the setting unit is mounted on the meter, flange 266c is connected by screws to a rearwardly extending flange 252a (Figure 5c) on front plate 252. Rear supporting plate 267 has a plurality of tapped studs 270 extending rearwardly from its rear surface. These studs are connected to rear plate 254 by screws passing thru holes 272. When the setting unit is mounted on the meter, the setting gears on the differential assemblies mesh with the setting gears on the setting assemblies, and the gear 101 by means of which the differential shaft is driven during a cycle of operation, meshes with gear 103 mounted on head shaft 96.

The registering unit includes a pair of side plates 278 and 280 which are connected by a top plate 282 and a spacing rod 284. The ascending and descending register shafts, the shaft 206 on which the idler gears 204, 384 and 386 (Figure 43) are mounted, and the Geneva gear shaft 200 (Figure 41) are mounted on side plates 278 and 280. When the meter is assembled, the Geneva gears 152, 376, and 378 are aligned so that they engage their respective setting assemblies and then the unit is moved into the framework 242 (Figure 5c) so that side plates 278 and 280 are positioned between plates 252 and 254. Screws passing thru holes 286 and 287 in plates 252 and 254 thread into tapped holes in side plates 278 and 280 such as holes 288.

The setting unit 244 and the registering unit 248 may each be removed independently of the other units; while removal of the head unit 246 is dependent upon simple prior lateral freeing of the Geneva gears 152, 376, and 378 from their driving elements on the head unit, which may be attained by loosening the registering unit and moving it laterally a short distance or by complete removal of the latter. Thus by simply removing a few screws and bolts the entire meter may be disassembled into its four units or any given section may be removed for purposes of examination or repair. This is a very important feature as it permits the person servicing the meter to make speedy repairs. Speedy repairs are of maximum importance because these meters are rented and any meter tied up for repairs is not producing revenue. Whenever a meter of the present type breaks down, the unit in which the failure occurs is replaced in a very short time and the meter is again ready to produce revenue. Also, during manufacture each unit may be tested on a test fixture so that all units are interchangeable.

As pointed out hereinabove, the carry over mechanism in the registers and the registers per se operate in a manner similar to the registers in Patent No. 2,482,935. However, the manner in which the registers are mounted on a registering unit and the resetting mechanism of the descending register is not shown in that patent. Referring to Figures 47 thru 51, each of the register counter wheel units into which units are fed by the registering sections of the setting assemblies is similar to the counter wheel unit shown in these figures. Briefly, it consists of a counter wheel 290 which is rotatably mounted on a shaft 291 by its hub 293 (Figure 51). A pair of pinions 292 and 294 (Figures 48 and 50) are rotatably mounted on counterwheel 290 on shafts 296 and 298, the longitudinal axes of which are parallel to the axis of shaft 291. The inner portions of the teeth on pinions 292 and 294 are in meshing engagement with each other and the outer portions of the gears are so positioned that each engages one of a pair of sun gears 300 and 302 extending into recesses 304 and 306 (Figure 51) on opposite sides of the counterwheel 290. Sun gears 300 and 302 (Figure 47) are formed on the hubs of feeding and carry over gears 308 and 310 which are rotatably mounted on the hub 293 of counterwheel 290. Gear 310 is driven by carry over mechanism from the counterwheel of the next lower order while gear 308 is driven by the gear train connected to the registering section of one of the setting assemblies on the head shaft. The lowest order counterwheel of each register has its carry over gear held stationary by teeth on brackets 312 and 314 (Figure 42) which are attached to plate 278 by nuts and bolts 316 and 318.

Figure 41:
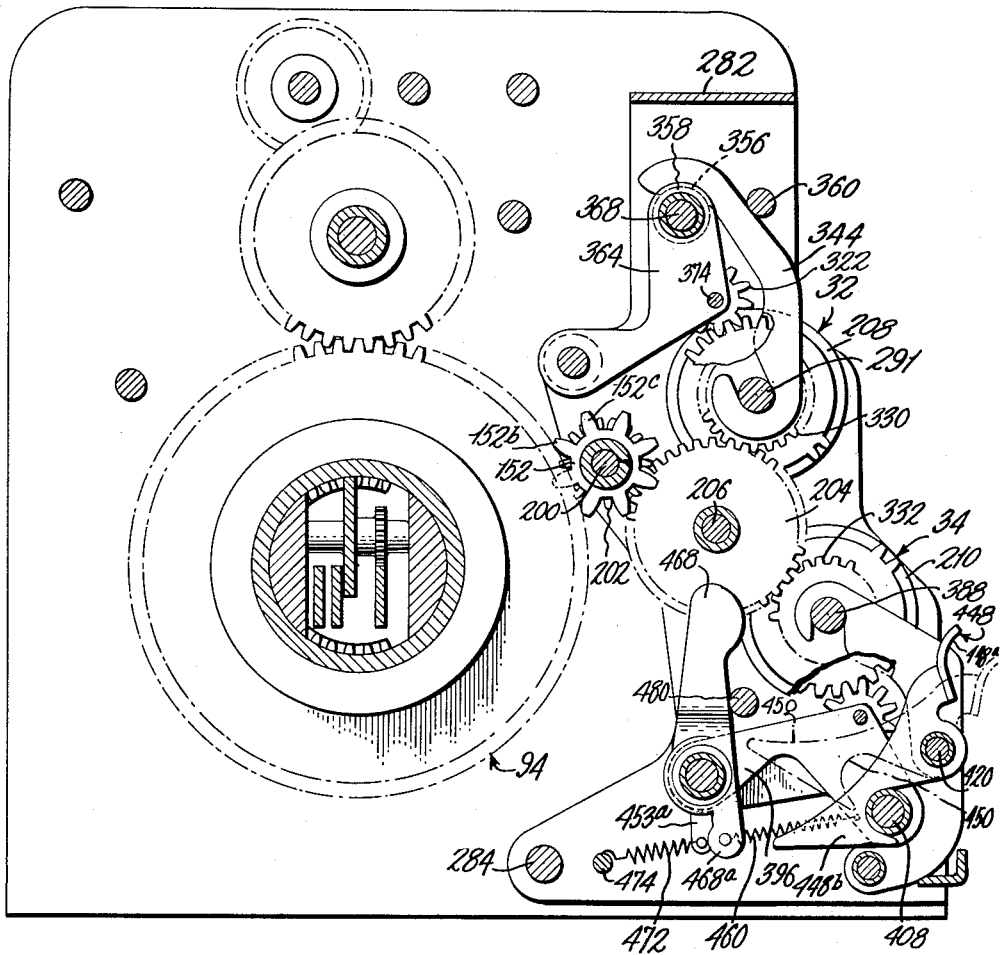
Figure 41 is a vertical section taken on the line 41—41 of Figure 3.

To carry over accumulated tens each counter wheel is provided with a Geneva disc such as disc 320 (Figures 47 and 49). Disc 320 acts upon a Geneva gear such as gear 322 (Figure 43) which is rotatably mounted on a shaft supported by plates 324 and 326. Gear 322 is connected to a feeding gear 328 which meshes with the carry over gear of the next counter wheel unit which is similar to feeding gear 310 (Figure 47). Thus, when a carry over is not taking place, units are fed into each counter wheel unit thru the idler gear connected to the counterwheel's feeding gears, for example, idler gear 204 feeds units into counter wheel feeding gears 330 and 332 (Figure 41). This registers on the counterwheels to which gears 330 and 332 are connected because the counter wheel pinions are turned by the sun gears connected to gears 330 and 332. The pinion engaging the carry over sun gear which is stationary, turns on this gear and thus causes the counterwheel to turn.

Carry overs may be effected at the same time that units are being fed into a counter wheel. When this takes place the feeding and carry over gears on both sides of a counterwheel are turned at the same time and the counterwheel moves an amount equal to the total movement of the carry over and feeding gears or the amount fed into the register counter wheel feeding gear plus one unit from the carry over feeding gear. This type of carry over is employed only in conjunction with the counter wheels into which units are fed. Carry overs between the higher order counterwheels of both registers are effected by standard Geneva discs, pinions and gears.

The counterwheels of the ascending register 32 are rotatably mounted on a shaft 291 (Figure 41) extending longitudinally of the meter and connected to side plates 278 and 280 (Figures 5d and 42). The counterwheel units are separated by a series of flat spacing members 342, 344, 346, 348, 350, 352 and 354. Members 342, 346, 348 and 350 are all similar to member 344 (Figure 41) and include lower portions which hook on the counterwheel shaft 291 and upper portions which fit in slots such as slot 356 in a sleeve 358 (Figure 41) which forms a portion of one of the Geneva gear supports. These members are held in assembled relationship by a rod 360 which extends longitudinally of the meter and has its ends positioned in holes in side plates 278 and 280. Because the upper ends of members 342, 344, 346, 348 and 350 extend over the top of the sleeves on rod 368 (Figure 41) and because of the hooks on their lower ends, they cannot be removed unless rod 360 is first removed. Spacing members 352 and 354 (Figure 42) are mounted on the counterwheel shafts and idler gear shaft 206 and separate the counterwheels not separated by spacing members 342, 344, 346, 348 and 350.

Each Geneva pinion is mounted on a support which includes a pair of end plates 363 and 364 (Figures 41 and 43) which are connected to a pair of sleeves 358 and 366. Sleeves 358 and 366 are mounted on a pair of rods 368 and 370 extending longitudinally of the meter and mounted on side plates 278 and 280. The sleeves mounted on rod 368 are held in spaced relationship with respect to each other by means of spacing sleeves 372. The Geneva gears are rotatably mounted on shafts such as shaft 374 (Figure 41) which are mounted on the outer portions of each pair of supporting plates. Each pair of supporting plates holds its Geneva gear in meshing engagement with the Geneva disc and carry over gear on two adjoining counterwheels so that the Geneva gear effects a transfer each time a counterwheel makes a revolution.

Figure 43:
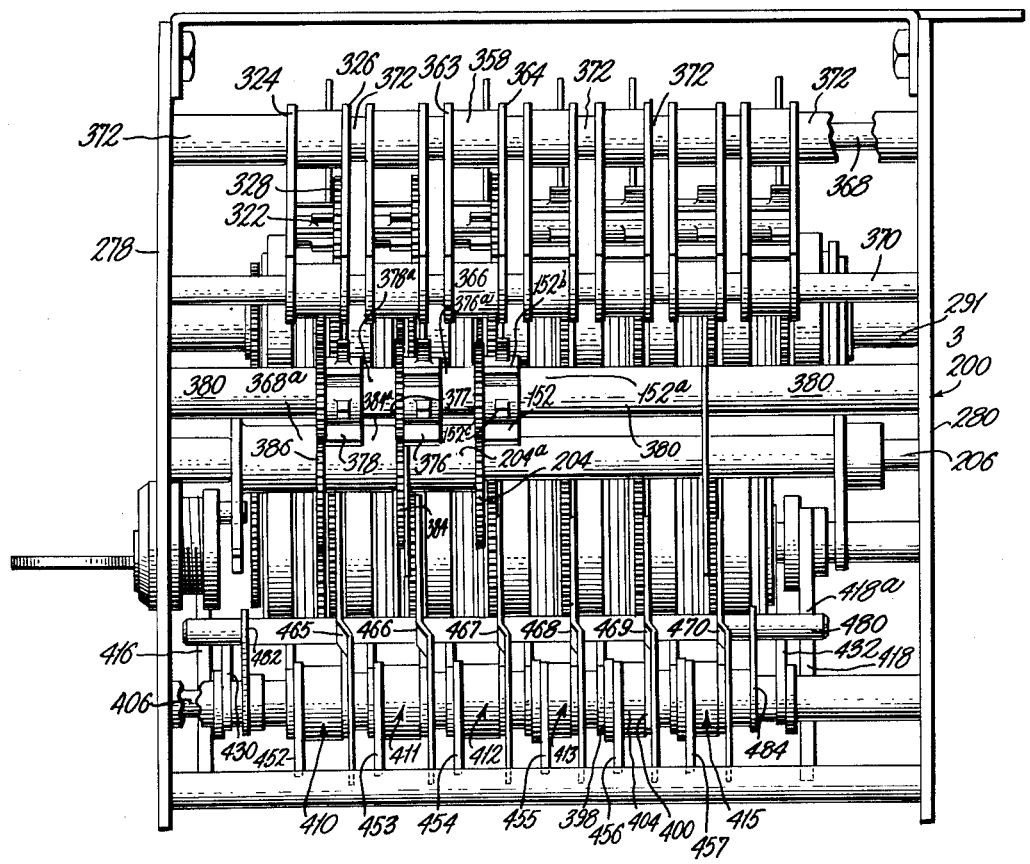
Figure 43 is a side elevation taken from the left hand side of the registering section of Figure 5d.

The Geneva gears 152, 376 and 378 (Figure 43) actuated by the registering sections of the setting assemblies are rotatably mounted on a shaft 200 (Figure 41) which has its ends mounted in holes in side plates 278 and 280 (Figure 43). The gears are held in correct position on shaft 200 by means of spacing sleeves 380 and by their hub portions 152a, 376a and 378a.

The idler gears 204, 384 and 386 (Figures 41 and 43) are rotatably mounted by their hubs 204a, 384a and 386a on a shaft 206, the ends of which are mounted in holes in side plates 278 and 280. These gears mesh with the feeding gears of the three lowest order counterwheels in each register and also with the gears associated with Geneva pinions 152, 376 and 378. Suitable means is provided to hold gears 204, 384 and 386 in proper alignment on shaft 206.

The counterwheels of the descending register 34 (Figure 42) are rotatably mounted on a shaft 388 (Figures 41 and 42), the ends of which are rotatably mounted in holes in side plates 278 and 280. This register descends by the amount of each stamp printed and when the higher order counterwheels reach zero position the meter is locked by mechanism to be described hereinafter. At this time the meter is taken to a post office where postage is purchased. The total sum purchased is set on the descending register counterwheels by an employee of the post office. In order to permit this to be done the Geneva carry over gears 390, 391, 392, 393, 394 and 395 are mounted so that they may be moved out of engagement with the counterwheels. When the Geneva gears have been moved out of engagement, the counterwheels may be turned on shaft 388 to a setting corresponding to the sum of postage purchased. Then the Geneva gears are moved back into carry over position.

Figure 52:
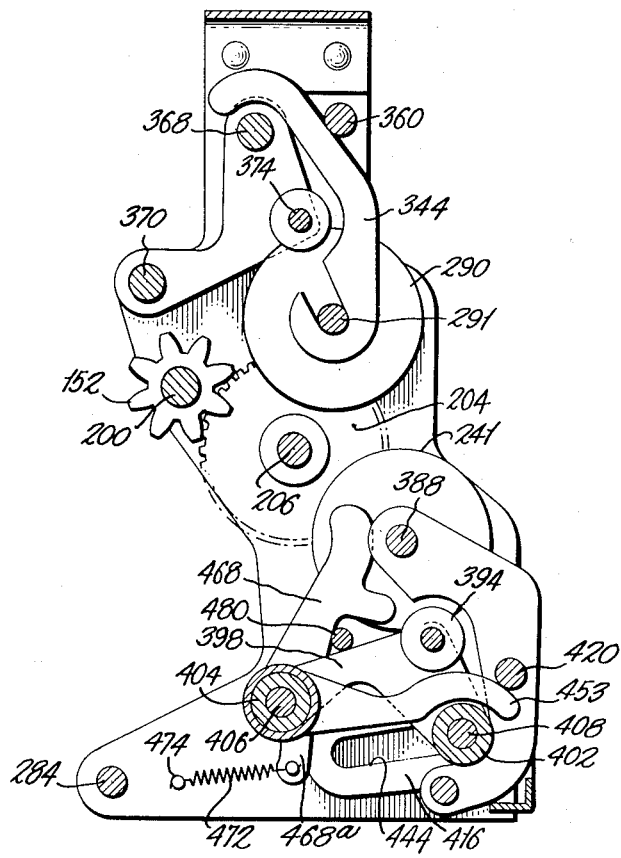
Figure 52 is a vertical section taken on the line 52—52 of Figure 42.

Each of Geneva gears 390, 391, 392, 393, 394 and 395 are mounted on an individual support which includes a pair of supporting plates similar to plates 396, 397 and 398 (Figures 41, 49 and 52). Each pair of side plates such as plates 398 and 400 (Figures 42 and 43) are connected to the ends of a pair of sleeves 402 and 404 (Figures 42, 43 and 52). Sleeve 404 pivotally mounts the support for Geneva gear 394 on a shaft 406, the axis of which is parallel to the axis of the counterwheel shaft and the ends of which are mounted in holes in side plates 278 and 280 (Figure 42). Sleeve 402 is mounted on a rod 408 (Figures 42 and 52), having its axis parallel to the axis of shaft 406. The supports for Geneva gears 390, 391, 392, 393 and 395 are all similar to the support described hereinabove and are generally indicated at 410, 411, 412, 413 and 414 (Figures 42 and 43). As these supports are all pivotally mounted on shafts 406 and are connected to rod 408, they may be moved in unison as a pivoted sub-frame by mechanism to be described hereinafter to move the Geneva gears 390, 391, 392, 393, 394 and 395 into and out of operative position with respect to the descending register.

The supports mounted on rod 408 are moved into and out of operative position by means of cam slots 444 and 446 (Figures 44 and 5d) in two cam plates 416 and 418 (Figures 5d, 42, 44, 45 and 53). Each of these plates is pivotally mounted on counterwheel shaft 388 and is substantially similar in construction. Plate 416 is connected to plate 418 by means of a rod 420 and screws 421 and 422 (Figure 42) which together constitute a secondary frame. A U-shaped bracket, generally indicated at 424, has its legs 424a and 424b Figures 5d, 42, 44 and 45) pivotally mounted on rod 420. The upper ends of legs 424a and 424b of bracket 424 are pivotally connected by rivets 426 and 428 to links 430 and 432 (Figures 5d, 42, 43 and 44), which have their inner ends pivotally connected to shaft 406. When the foot portion 424c (Figures 5d and 44) is pulled outwardly and upwardly, links 430 and 432 cause rod 420 to move upwardly. As rod 420 is connected to cam plates 416 and 418, the cam plates move upwardly to the position plate 416 occupies in Figure 45. Plates 416 and 418 (Figures 5d, 44 and 45) are provided with cam slots 444 and 446 into which the ends of rod 408 (Figure 42) extend. These cam slots act upon rod 408 (Figures 44 and 45) to move it downwardly as the foot portion 424c of bracket 424 moves upwardly. As the supports for the Geneva gears 390, 391, 392, 393, 394 and 395 (Figure 42) are mounted on rod 408, the supports and thus the Geneva gears are moved downwardly out of engagement with the counterwheels of the descending register.

To lock the Geneva gears in carry over position a locking lever, generally indicated at 448 (Figure 41) is provided. This lever is pivotally mounted on rod 420 and includes a fingerpiece 448a and a hook portion 448b. By moving the lever 448 in a clockwise direction on rod 420 to the dotted line position 450, the hook portion 448b is moved to a position where it does not engage rod 408 when rod 420 is moved outwardly and upwardly. However, when the lever 448 is in its full line position its hook portion 448b hooks on rod 420 and prevents the Geneva gears from being disengaged from the counterwheels.

When the Geneva gears are moved out of engagement with the counterwheels, mechanism is provided to prevent the gears from turning while out of engagement with the counterwheels. If such mechanism is not provided, the gears may turn while they are out of engagement with the counterwheels and if they turn, they may jam and thus not go back into mesh with the counterwheels because of their wide and narrow teeth. Accordingly, fingers 452, 453, 454, 455, 456 and 457 (Figures 42, 43 and 49) are provided which engage the Geneva gears 390, 391, 392, 393, 394 and 395 whenever the Geneva gears are moved out of engagement with the counterwheels. As all fingers are substantially similar in construction and operation, details of descriptions and operation will be limited to finger 453 (Figure 49).

Finger 453 is pivotally mounted on the sleeve 411a which forms a part of the Geneva gear support 411 for gear 391. Finger 453 includes an arm 453a (Figures 41 and 49) which is connected by a spring 460 to support 411. Spring 460 resiliently urges finger 453 in a counter-clockwise direction at all times. When the Geneva gears of the descending register are engaged, rod 420 acts to hold finger 453 out of engagement with gear 391. However, when rod 420 moves upwardly it permits finger 453 to engage the teeth of Geneva gear 391 before gear 391 is disengaged from the counterwheels. As indicated by the dotted line position 462 of the finger 453, the upper surface of the finger engages two wide teeth of Geneva gear 391 and holds it in its set position while the register is being reset. After the counterwheels are reset and rod 420 moves downwardly, it engages finger 453 and moves it out of engagement with gear 391. All of the fingers 452, 453, 454, 455, 456 and 457 (Figures 42 and 43) operate in a similar manner and thus all of the Geneva gears go back into mesh after the meter has been reset as their teeth are properly aligned with the Geneva discs and carry over gears.

When the Geneva gears are out of engagement with the counterwheels on the descending register all of the counterwheels may be freely turned with the exception of the half cent counterwheel. The cents and tens of cents counterwheels may be turned without turning the idler gears which feed units into them because of their differentials and the next higher order counterwheels are completely out of engagement with respect to each other and the meter when the Geneva gears are moved downwardly. To aid the person setting the counterwheels a series of detents 465, 466, 467, 468, 469 and 470 (Figure 43) are provided. These detents are all similar in construction and operation and thus specific details of construction will be limited to detents 465 and 468 (Figures 49 and 52). Detent 468 is pivotally mounted on shaft 406 and includes an arm 468a which is connected by a spring 472 to a rod 474. Spring 472 at all times resiliently urges detent 468 in a clockwise direction (Figure 52). Referring to Figure 49, the upper end of detent 465 includes a nose portion 465a which engages a notched disc 476 connected to counterwheel 241. The nose portion 465a and disc 476 coact to align the counterwheel in any one of ten different positions, with one of the digits thereon aligned with window 477 (Figure 1). In the same manner the detents 465, 466, 467, 468, 469 and 470 (Figure 43) align the digits on all of the descending register counterwheels with respect to window 477.

Figure 44:
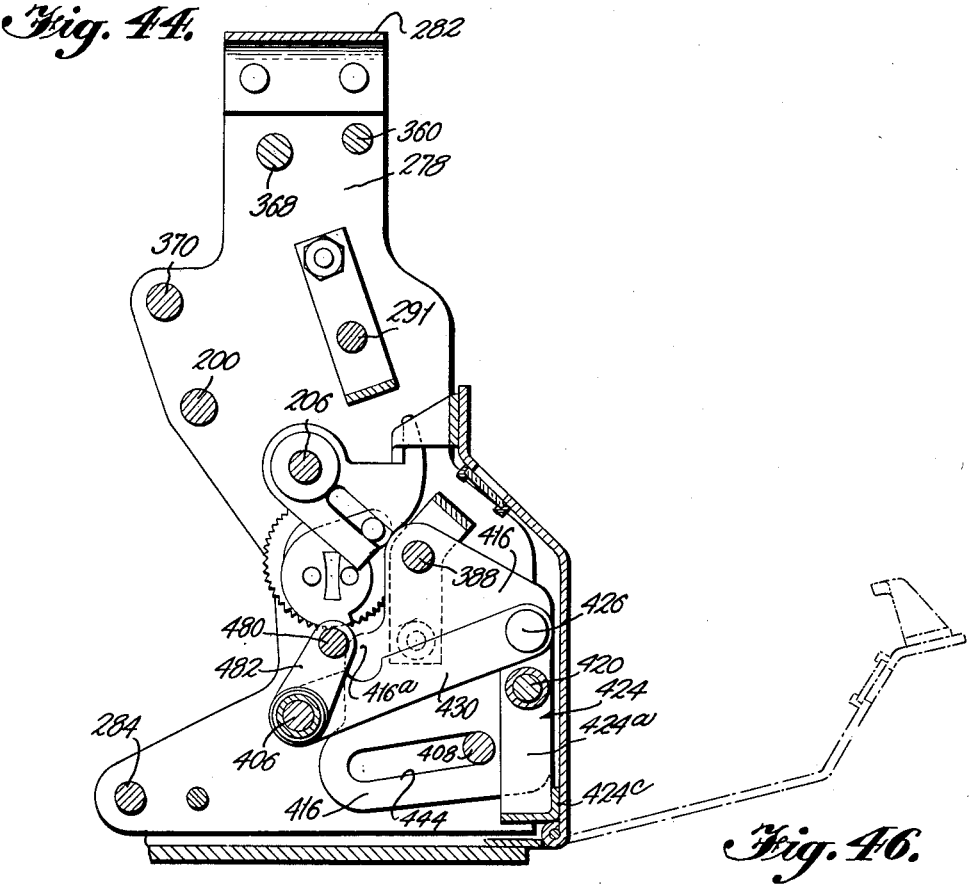
Figure 44 is a vertical section taken on the line 44—44 of Figure 42.

When the Geneva gears are engaged, mechanism is provided to move detents 465, 467, 468, 469 and 470 out of engagement with the counterwheels. This mechanism includes a rod 480 (Figure 49) which extends longitudinally of the meter and is pivotally mounted on shaft 406 by two arms 482 and 484 (Figures 43 and 44). It will be noted that the ends of rod 480 extend forwardly and rearwardly from arms 482 and 484 so that they are in the path of portions 416a and 418a (Figures 43, 44 and 45) of cam plates 416 and 418. Thus, when the cam plates are moved upwardly, the portions 416a and 418a are moved out of engagement with the ends of rod 480, and the springs move the detents into engagement with the notched discs on the counterwheels. At this time the detents are all in the position of detent 465 (Figure 49) as indicated by the dotted line 482. When the cam plates 416 and 418 (Figure 44) are moved downwardly to move the Geneva gears into operative position, the portions 416a and 418a of the cam plates 416 and 418 move rod 480 into engagement with the detents and rod 480 moves the detents out of engagement with the notched discs on the counterwheels. Thus, during operation of the meter the detents do not affect the operation of the descending register in any way.

Figure 45:
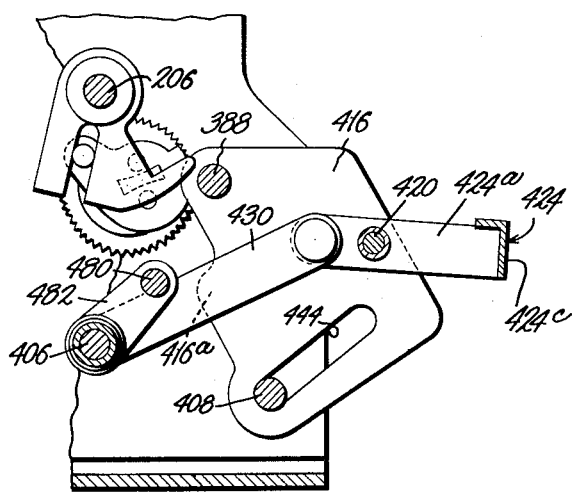
Figure 45 is a view similar to Figure 44 with certain parts in different relative positions.
Figure 46:
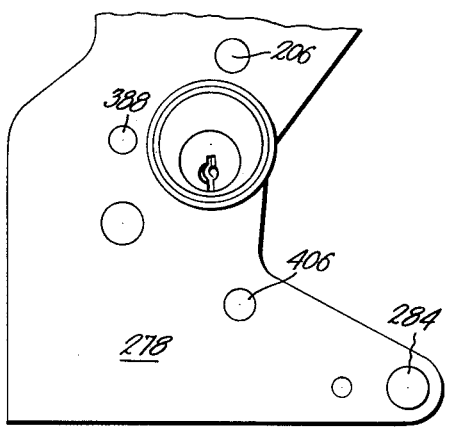
Figure 46 is a side elevation taken on the line 46—46 of Figure 42.

Thus, by moving the center portion 424c of bracket 424 (Figure 44) to the position it occupies in Figure 45, the Geneva gears are moved out of engagement with the counterwheels, fingers automatically engage the Geneva gears to prevent their turning while they are out of engagement and detents engage the counterwheels to aid the post office employee in setting the counterwheels. When center portion 424c is moved downwardly after setting, the Geneva gears engage the counterwheels, and the fingers and detents are moved out of operative position. This resetting mechanism is simple and efficient and is characterized by the ease with which the register may be reset.

For different types of mail different types of stamp impressions are required. For first class mail, airmail, parcel post and special delivery, the meter impression must include the meterstamp, town circle, and date. For registered mail the impression must include only the meterstamp. For third class mail, the impression must include the meterstamp and town circle without date, and bulk mail impressions must consist of the meterstamp, town circle without date, and the P. L. and R. section number. In order to print the different impressions required by the different types of mail, the town circle, date and P. L. and R. dies are adjustable into and out of printing position. All of these dies are mounted on the printing head of the meter, generally indicated at 30 (Figures 3 and 4). The head is cylindrically shaped, is mounted on the forward end of the head shaft 96 (Figure 2) and makes one revolution for each cycle of operation. The dies are moved into operative position by means of a cam actuated by a setting knob 486.

Setting knob 486 (Figure 28) is rotatably mounted on a sleeve 489 which is rotatably mounted on a stud shaft 488. Stud shaft 488 is secured to the front plate 490 of the printing head 30, and front plate 490 is secured to the framework of the head by screws such as screws 492 (Figure 4). Movement of knob 486 rearwardly on sleeve 489 (Figure 28) is limited by an annular shoulder 494 formed on sleeve 489. Movement of knob 486 forwardly on sleeve 489 is limited by engagement of a disc 496 secured to shaft 488 with a seat 498 in knob 486. Disc 496 also prevents sleeve 489 from moving outwardly on shaft 488. A recess 500 is provided in knob 486 to receive a spring 502 which is under compression. Spring 502 resiliently presses knob 486 against shoulder 494 at all times.

Knob 486 has an indicating plate 504 (Figures 2, 3, 4 and 28) connected to it by rivets 503 and carrying reference characters 506 (Figure 3) indicating the type of impression being made. Each of the characters 506 may be brought into registration with an indicating finger 508 (Figure 1) on the housing of the meter, and the meter impression corresponds to the reference character aligned with finger 508. To permit knob 486 to be retained in any one of the four positions, it is provided with a pin 510 (Figures 4 and 28). This pin 510 (Figure 4) may be positioned in any one of four different holes in front plate 490, two of which are shown at 512 and 514. To change the setting of knob 486, it is pulled outwardly and turned, until the reference character (Figure 3) indicating the impression desired is aligned with finger 508 (Figure 1). At this time the pin 510 is aligned with one of the four holes in front plate 490, and when knob 486 is released, the pin will enter the hole with which it is aligned and lock the setting knob 486 in the desired position. Pin 510 extends through a hole 516 (Figure 28) in a cam plate 518, which is mounted on and connected to sleeve 489. Cam plate 518 controls the setting of the dies as will be described hereinafter and because of pin 510, plate 518 turns with knob 486.

Figure 35:
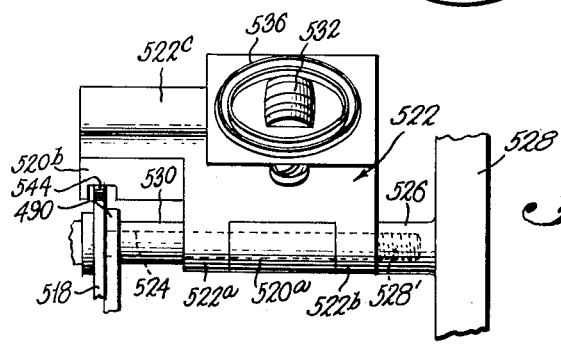
Figure 35 is a side elevation of certain portions of the printing head taken from the line 35—35 of Figure 32.

The date and town circle dies are mounted on independent supports, generally indicated at 520 and 522 (Figure 32), which are pivotally mounted on a shaft 524. Shaft 524 is parallel to the longitudinal axis of printing head 30 and extends between front plate 490 (Figure 35), and a boss 526 formed on a portion 528 of the framework of the printing head. The rear end of shaft 524 is threaded and it threads into a threaded hole 528' in boss 526. Support 522 has a pair of leg portions 522a and 522b which pivotally mount it on shaft 524. The date die support 520 has a portion 520a (Figures 33 and 35), positioned between leg portions 522a and 522b which pivotally mounts support 520 on shaft 524. A spacer sleeve 530 and the forward end of boss 526 keeps the supports correctly positioned on shaft 524. As is best shown in Figure 33, the rotatable date dies 532 are mounted on a shaft 534 and fit within the town circle die 536. Supports 520 and 522 are so constructed that the date dies 532 may be moved into and out of printing position when the town circle is in printing position. Supports 520 and 522 are connected by springs 538 and 540 to a pin 542 mounted on the framework of the printing head. These springs are under tension, and thus, when the supports are not held in printing position by cam plate 518 (Figure 31), springs 538 and 540 (Figure 33) move the date and town circle dies out of printing position.

Figure 31:
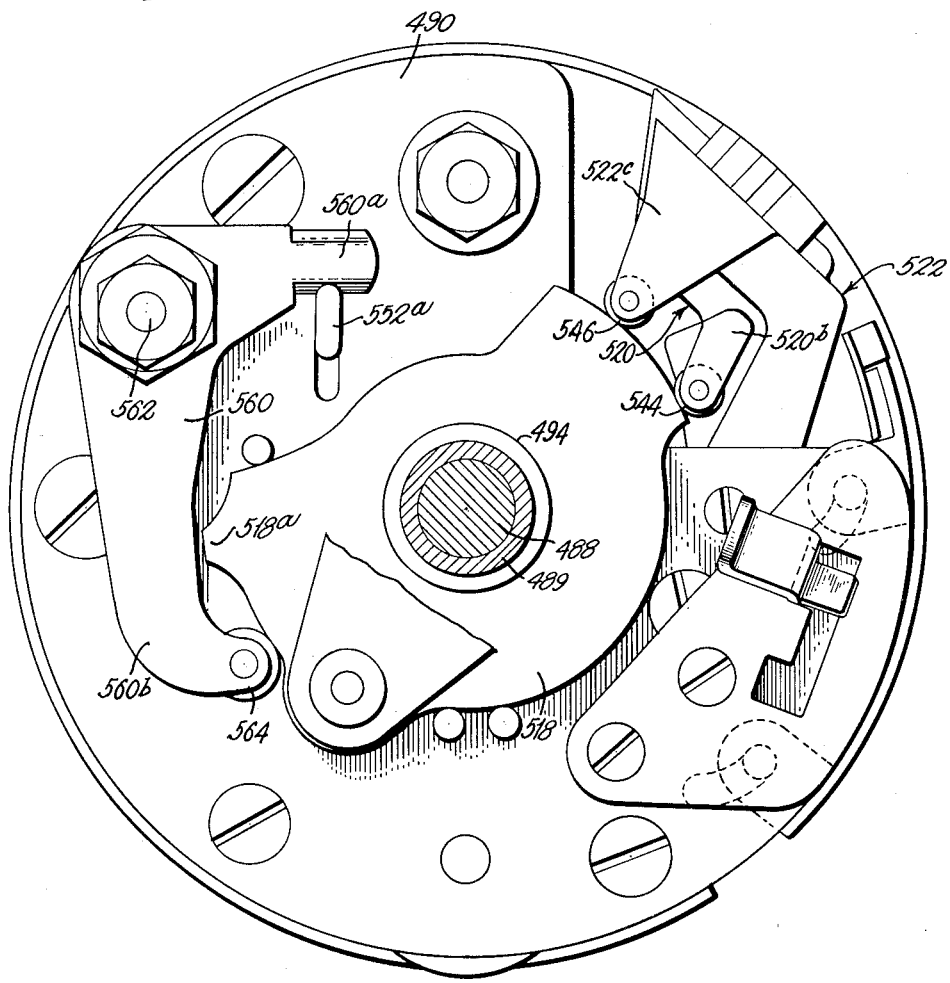
Figure 31 is a vertical transverse section taken on the line 31—31 of Figure 28, certain parts being broken away for purposes of illustration.
Figure 32:
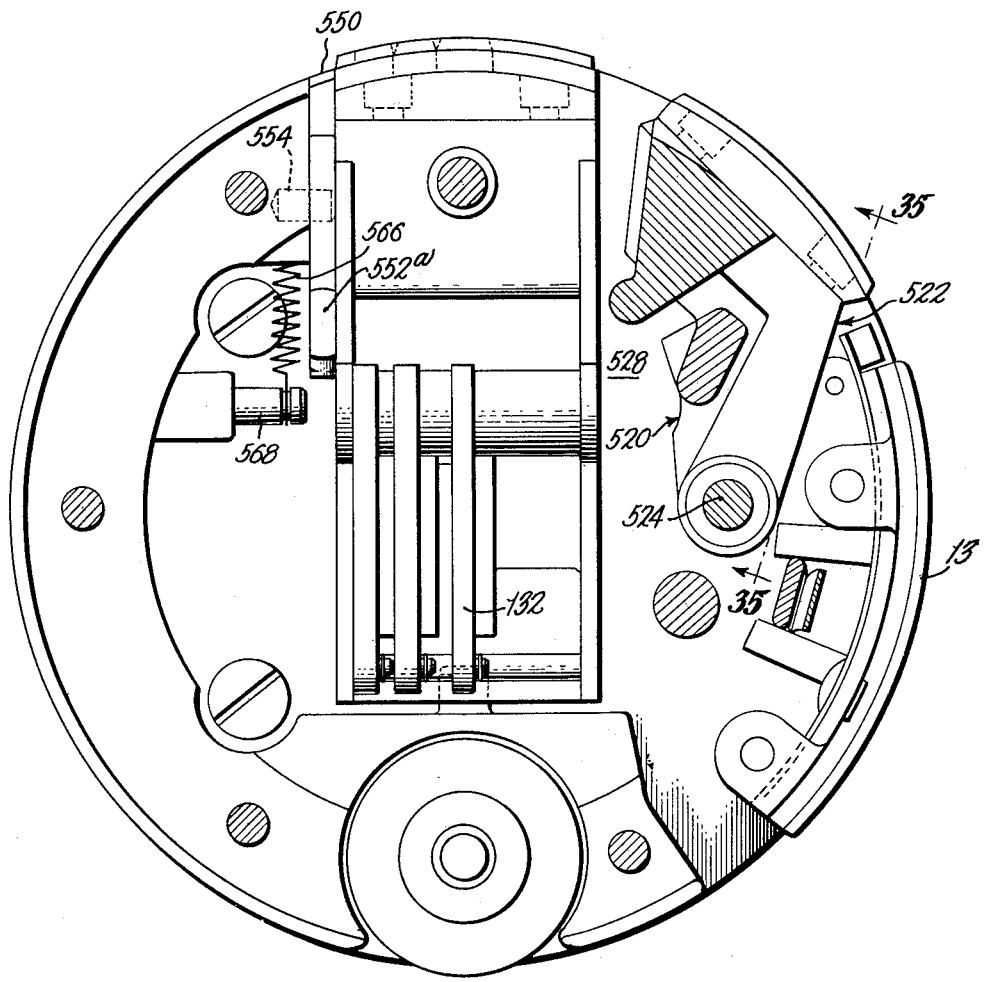
Figure 32 is a vertical section taken on the line 32—32 of Figure 28.

As pointed out hereinabove, the position of the dies is controlled by cam plate 518 (Figure 31). To permit cam plate 518 to control the position of support 520, support 520 has a forwardly extending arm portion 520b (Figures 31 and 35) which has a roller 544 held in engagement with the periphery of cam plate 518 by spring 538 (Figure 33). Support 522 (Figures 31 and 35) has a forwardly extending arm portion 522c which has a roller 546. Spring 540 (Figure 33) holds roller 546 (Figure 31) in engagement with the periphery of cam plate 518. Thus, as cam plate 518 is turned by knob 486 (Figure 28), the shape of the portion of the periphery of cam plate 518 (Figure 31) in engagement with rollers 544 and 546 determines the position of the supports 520 and 522 and thus the movement of the date and town circle dies into and out of printing position.

The P. L. and R. die 550 (Figure 34) is mounted on a support 552. Support 552 is pivotally mounted on a pin 554 (Figures 32 and 34) which permits die 550 to be moved from non-printing position (full lines) to printing position indicated by the dotted line 556. Support 552 has an arm 552a which extends through a slot 558 in front plate 490. A bell crank 560 (Figure 31) is pivotally mounted on a stud shaft 562 which is mounted on front plate 490. Bell crank 560 moves in a plane parallel to front plate 490 and has an arm 560a which extends across the outer end of support arm 552a. Another arm 560b of bell crank 560 has a roller 564 which engages the periphery of cam plate 518.

Figure 34:
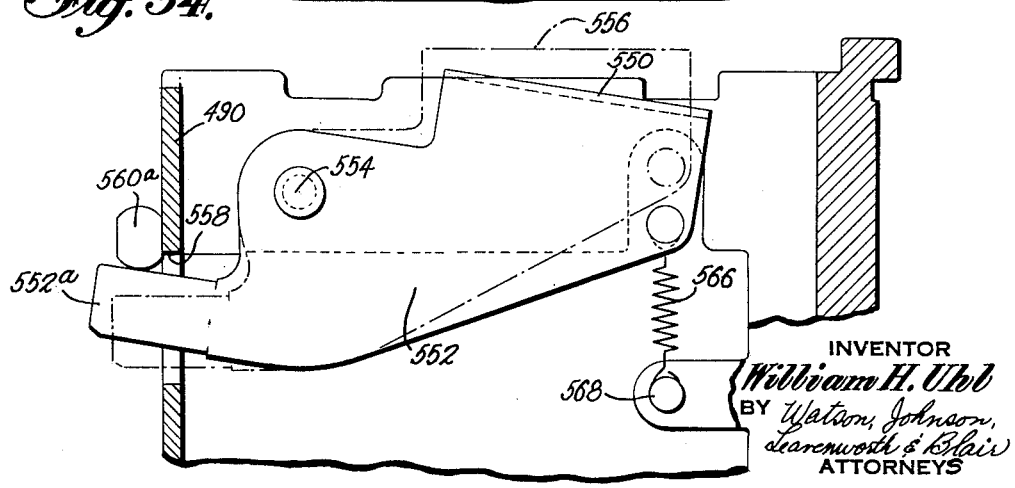
Figure 34 is a vertical longitudinal section taken on the line 34—34 of Figure 33.

Referring to Figure 34, a spring 566 connected to support 552 and to a pin 568 mounted on the framework of the printing head resiliently urges support 552 toward a non-printing position at all times. Thus spring 566 causes arm 552a to resiliently press upwardly on arm 560a (Figure 31) of bell crank 560. Thus spring 566 holds roller 564 in contact with the periphery of cam plate 518. The shape of the portion of cam plate 518 engaging roller 564 determines whether or not the P. L. and R. die is in printing position. When the raised portion 518a of plate 518 engages roller 564, the P. L. and R. die is moved to printing position.

Thus, by turning knob 486 (Figure 3) so that the reference character for the desired type of mail is aligned with the indicating finger 598 (Figure 1), the cam plate 518 (Figure 4) will be positioned so that the town circle, date and P. L. and R. dies are in printing or non-printing position and the desired impression will be made. As pointed out hereinabove, the cam 518 moves the dies into printing position by acting on rollers 544, 546 and 564 (Figure 31) and springs 538, 540 and 566 (Figures 33 and 34) hold the dies in non-printing position when they are not moved into printing position by cam plate 518.

At times when mail is being run on meters now in use, one of the setting levers is accidently moved, resulting in the printing of a stamp of too large or too little value. This either causes a loss to the user, or causes the inconvenience of having to place additional postage upon the mail having a stamp of insufficient value. To prevent this, a locking lever 190 (Figure 2) is mounted on shaft 178. The hub 192 of lever 190 is pinned to shaft 178 by means of pin 194. When a cycle of operation starts, roller 172 (Figure 19) is forced out of recess 176 as disc 168 turns. This turns shaft 178 and thus lever 190 (Figure 18) in a clockwise direction. This moves the upper end of lever 190 out of the path of the rear end of a lever 196 (Figure 2) pivotally mounted on shaft 50 so that it is moved downwardly by means of a spring 198. The nose 196a of lever 196 enters a notch 200 (Figures 2 and 18) in locking lever 190 and it prevents shaft 178 from turning in a counter-clockwise direction when roller 172 is again aligned with recess 176 at the end of a cycle of operation. This also holds the nose of all of the detents such as detent 182 (Figure 21) in the notches between the teeth of the aligner discs and this prevents the setting levers from being moved. Thus, the setting levers are locked in their selected positions until the operator presses downwardly upon the forward end of lever 196 when the machine is in a "home" position. When this is done, locking lever 190 (Figure 18) is freed and spring 180 (Figure 19) turns shaft 178 to move the aligning detents out of engagement with the notches in the aligner discs (Figure 21). At this time the setting levers may be manipulated to change the sum being printed and registered.

Mechanism is provided to count the number of printing operations so that it may be determined how much use a meter has had. This mechanism includes a disc 570 (Figure 16) having its hub 570a pinned to the differential shaft 74. As the differential shaft makes one revolution each time the head shaft makes a revolution, the number of revolutions of shaft 74 indicates the number of printing operations that have been made. Disc 570 (Figure 18) has a pin 572 which acts upon one end 574a of an arm 574. Each time shaft 74 makes a revolution, arm 574, which is pivotally mounted on a stud shaft 575, acts through its forked upper end 574b upon the actuating pin 576a of a standard counter, generally indicated at 576 (Figure 3). Counter 576 registers the reciprocations of arm 574 and thus the revolutions of disc 570. The reading of counter 576 is visible through a window 578 (Figure 1) in the housing of the machine.

When the meter is removed from the machine, the head shaft 96 (Figure 2) must be locked to prevent the printing head from being turned into printing position. The head shaft is locked by means of a bell crank, or locking arm, generally indicated at 580 (Figure 7) which is pivotally mounted on a stud shaft 582 mounted in turn on rear plate 254. The hub 168a of disc 168 (Figures 7 and 29) has a recess 585 in its periphery which coacts with the nose portion 580a of one of the arms of bell crank 580 to lock hub 168a and thus shaft 96 against rotation.

To move nose portion 580a out of recess 585 the other arm 580b of bell crank 580 is pivotally connected by a pin 586 to the upper end of a pin 588. The lower end of pin 588 is provided with a mushroom head which is engaged by mechanism on the meter power unit and pulled downwardly when the meter is being mounted on the power unit to condition the meter for operation by releasing shaft 96. Pin 588 is provided with a collar 590 against which a spring 592 presses upwardly at all times. When pin 588 is moved downwardly, it acts through arm 580b of bell crank 580 to move its nose portion 580a out of recess 585. This frees head shaft 96.

To prevent pin 588 from being moved downwardly unless it is positioned on the meter power unit, locking mechanism, generally indicated at 594 (Figure 2) is provided. This locking mechanism includes three locking elements 596, 597 and 598 (Figures 2, 9 and 12). These elements are all similar to element 596 with the exception that they have different length arms 596a, 597a and 589a (Figure 10). All three elements are pivotally mounted on a pin 599 which extends longitudinally of the machine. A spring 602 (Figure 9) having three fingers 602a, 602b and 602c is secured to the base of the meter by screws 604. Fingers 602a, 602b and 602c bear downwardly on extensions 606, 607 and 608 formed on arms 596a, 597a and 598a of elements 596, 597 and 598. The lower ends of arms 596a, 597a and 598a extend through openings 610 (Figure 10) in the base of the meter, and when the meter is removed from the power unit spring fingers 602a, 602b and 602c hold extensions 606, 607 and 608 against the top of the base 612 of the meter.

When the meter is mounted on the power unit, the lower ends of arms 596a, 597a and 598a engage a cam surface or key means, generally indicated at 614 (Figure 12) on the power unit. Cam surface or key means 614 includes three surfaces 614a, 614b and 614c of different heights which press upwardly on arms 596a, 597a and 598a to align slots similar to slot 596b (Figure 10) in the top of each of elements 596, 597 and 598 with respect to a locking bar 616 (Figure 2). When thus aligned, the slots receive the lower edge of locking bar 616 which extends longitudinally of the meter and has its right hand end pivotally mounted on the meter by bolt 618. The nose portion 616a (Figure 12) of bar 616 extends beneath arm 580b of bell crank 580 (Figure 7) and when bar 616 is in the slots in the upper ends of elements 596, 597 and 598 (Figure 9), pin 588 (Figure 7) may be pulled down to free the head shaft 96. When the slots in the upper ends of elements 596, 597 and 598 are not aligned, then bar 616 and pin 588 cannot be moved downwardly. This prevents the nose 580a of bell crank 580 from being moved out of recess 585. Thus, in order to free the head shaft each element must be turned a certain amount in a counterclockwise direction as viewed in Figure 10 until the slots in elements 596, 597 and 598 are aligned. This is very difficult to do manually as all three slots must be aligned at the same time with bar 616 before pin 588 can be moved downwardly to free the head shaft.

To prevent the head shaft from being turned in a reverse direction a pair of locking shoes 620 and 622 (Figure 7) are provided. Shoes 620 and 622 are mounted on pins 624 and 626 on rear plate 254. These shoes have cam shaped surfaces of gradually increasing radius and are resiliently urged in a counterclockwise direction at all times by springs 628 and 630. Because of their cam shaped surfaces, when the head shaft 96 is turned in a clockwise direction (Figure 7), the cam shaped surfaces of shoes 620 and 622 wedge against hub 168a and thus prevent shaft 96 from turning. However, the shoes 620 and 622 do not prevent the shaft from turning in the opposite direction.

As an additional safeguard against reverse turning three pawls of different lengths 632, 633 and 635 (Figures 7 and 9) are provided. These pawls are pivotally mounted on a pin 634 which is in turn mounted on rear plate 254.

Springs 636, 637 and 639 (Figure 9) resiliently urge pawls 632, 633 and 635 in a counterclockwise direction at all times to hold their nose portions such as nose portion 632a in engagement with the periphery of hub 168a. The nose portions of pawls 632, 633 and 635 are so shaped that they will not prevent counterclockwise rotation of hub 168a, but when hub 168a is turned in the reverse direction, the nose portions engage any one of recesses 585, 587, or 589. Thus, the nose portions of pawls 632, 633 and 635 effectively prevent the head shaft 96 from being turned in reverse when in inking, printing, or in home position.

To lock the machine when the supply of postage on the higher order counterwheels is exhausted, a zero lock is provided. The zero lock includes a series of fingers 640, 642, 644 and 646 (Figure 13) which have their hub portions 640a, 642a, 644a and 646a connected so that they move as a unit. The hub portions 640a, 642a, 644a and 646a are pivotally mounted on a shaft 645 extending longitudinally of the meter. Each finger has a nose portion similar to nose portion 646b (Figure 15) of finger 646 which engages the periphery of a disc, such as disc 648, each disc being connected to each of the higher order counterwheels. Each disc is provided with a recess, such as recess 648a, which is positioned opposite the nose portion of its related zero-lock finger when its counterwheel is in zero position. When all of the higher order counterwheels are in zero position, then all of the fingers 640, 642, 644 and 646 move as a unit in a clockwise direction (Figure 14) as their nose positions enter the recesses in their respective discs.

To move fingers 640, 642, 644 and 646 in a clockwise direction an arm 650 is connected to and carried on hub 646a (Figure 13). Arm 650 (Figure 15) extends beneath a locking collar 652 connected to head shaft 96, and its left-hand end 650a (Figure 15) is resiliently urged upwardly at all times by a spring 654. Arm 650 is provided intermediate its ends with a locking finger 650b which is positioned beneath collar 652. When fingers 640, 642, 644, and 646 enter the notches in the discs on their respective counterwheels at the time that all counterwheels are in zero position (Figure 15), then, when the meter is in "rest" position, locking finger 650b enters a recess 654 in collar 652 and prevents head shaft 96 from being turned. This prevents further operation of the meter.

When finger 650b enters recess 654, portion 650a of arm 650 (Figures 15 and 15a) acts upon the flange portion 651a of pin 651 and moves it upwardly against the action of spring 671. This frees meter pin 673 so that the tripping mechanism on the power unit is permitted to move to a disengaged position. When the tripping mechanism is disengaged, it renders the power unit mechanism driving the head shaft inoperative. Because there is no direct connection between pin 651 and meter pin 673, it is impossible to tamper with the zero lock mechanism of the meter by manipulating pin 673. However, when the zero lock mechanism is not in locking position, spring 671 moves pin 651 downwardly so that it engages and moves meter pin 673 into operative position. Meter pin 673 at this time acts upon the tripping mechanism and makes it operative.

To prevent the tips of fingers 640, 642, 644 and 646 from bearing on the peripheries of the notched discs on the counterwheels and thus increasing the load on the gears turning the counterwheels, locking finger 650b (Figure 15) is provided with a roller 660 which rides on the periphery of collar 652 during each cycle of operation. The length of finger 650b is such that the nose portion of fingers 640, 642, 644 and 646 are held out of engagement with their respective notched counterwheel discs during each cycle of operation. At the end of each cycle of operation, when finger 650b is aligned with recess 654, then all of the fingers move toward their notched discs to sense whether or not the notches are aligned.

When supply of postage is exhausted, the nose portions of fingers 640, 642, 644 and 646 simultaneously engage in the recesses in the locking discs fastened to the counterwheels (such as nose portion 646b of finger 646 which at that time drops into recess 648a of disc 648), thereby locking the higher order counterwheels of the descending register at their zero positions to lock out the meter.

Figure 53:
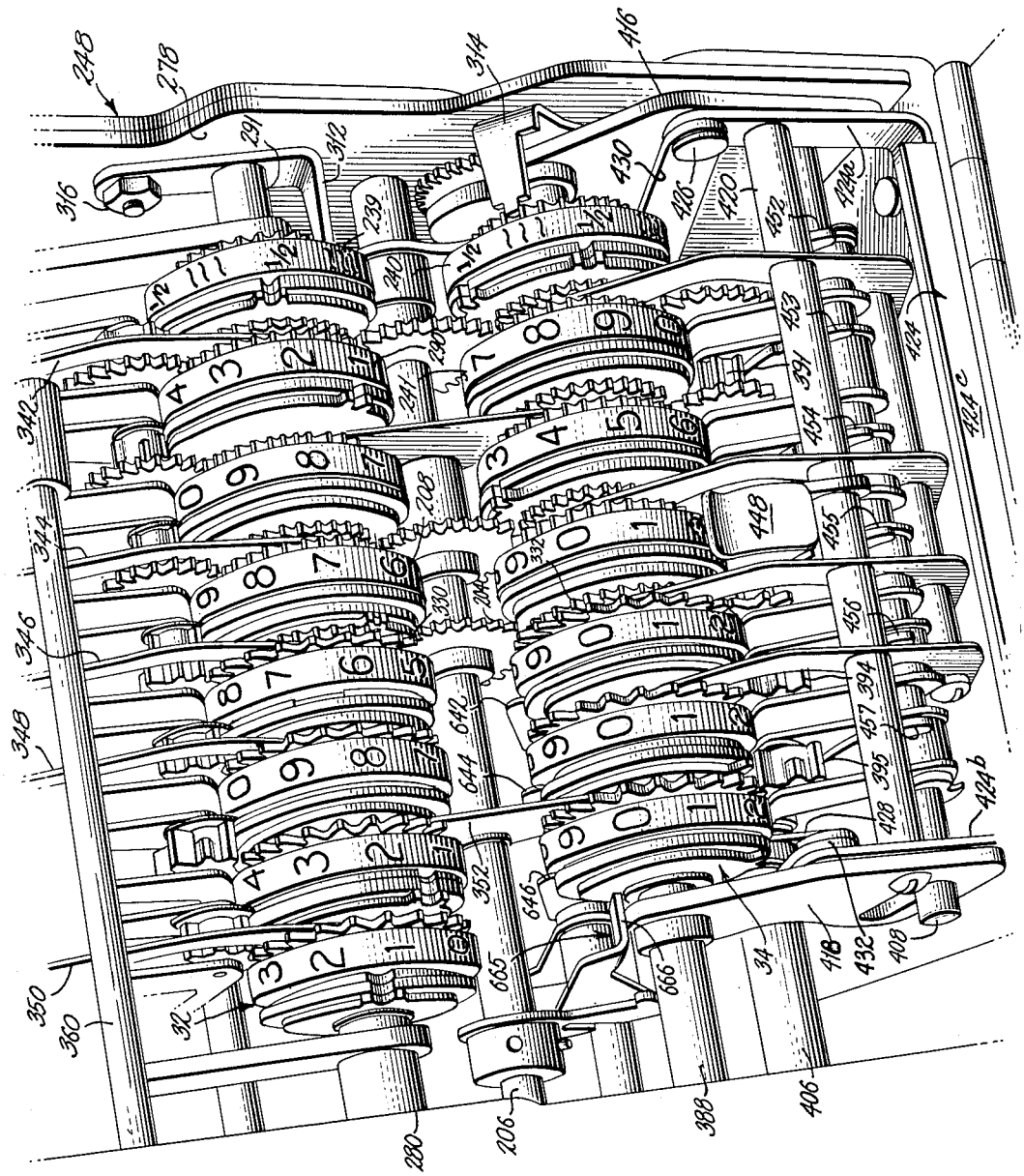
Figure 53 is a perspective view of the registers as exposed for resetting.

Hub 646a carries, in addition to finger 646 and arm 650, a lever arm 665 having a lateral extension or finger 666 positioned over the top end of pivoted plate 418 (Figures 13, 14 and 53). As previously explained, when the foot portion 424c of bracket 424 is pulled out and swung upwardly plate 418 swings out and up. Again referring to Figures 13, 14 and 53 this upward swing or raising of the top edge of plate 418 will lift finger 666 to pivot upwardly lever arm 665 which is connected to hub 646a and therefore rotates this hub. Thus, in resetting the meter with the swinging of bracket legs 424a and 424b by lifting of bracket foot portion 424c, as indicated in Figure 45, plate 418 will swing to lift lever arm 665 which rotates hub 646a to raise the nose portions of fingers 640, 642, 644 and 646 (Figures 13, 14 and 15) out of the respective recesses such as recess 648a (Figure 15) in the counterwheel discs. This permits the registers to be reset by the Post Office employee by direct manual contact with the exposed, readily accessible and now unlocked register counterwheels, and without necessitating the use of a stylus or other tool.

The housing 10 (Figure 1) includes a portion 11 which covers the printing head. In order to permit the user to change the removable slogan die 13 (Figure 32), housing portion 11 is provided with a door 15 (Figures 1 and 23). Door 15 is mounted on and connected to a shaft 17 which is rotatably mounted on housing portion 11. Shaft 17 is coupled to another shaft 19 (Figure 13) which is rotatably mounted on the framework portion of the meter. A cam disc 21 is mounted on shaft 19 and raises an arm 23 whenever door 15 (Figure 23) is opened. When arm 23 is raised, an extension 25 thereon enters notch 654 (Figure 15) in collar 652 and thus prevents further rotation of head shaft 96. Arm 23 is pivotally mounted on a shaft 27 and includes a portion 29 which raises meter pin 651 whenever door 15 is opened. This prevents the power unit from being tripped while the slogan door 15 is open. A spring 31 normally holds arm 23 in a downward position so that it does not act on collar 652 and pin 651. Thus, when door 15 is open, the portion 21a of disc 21 acts through arm 23 to prevent operation of the meter. When the door is closed extension 25 comes out of recess 654 and the meter pin is released so that the meter is again ready for operation. Having the door 15 interlocked with the head shaft 96 and tripping mechanism prevents tampering and is an important safeguard, as a person could be seriously injured if the printing head turned over while the slogan die 13 was being changed.

In operation, the user sets the amount of postage to be printed by setting the setting levers 12, 14 and 16 (Figure 1). The sum to be printed appears in the windows 46, 47 and 49. For example, if three cents is to be printed, setting lever 14 is moved upwardly until the reference character 3 appears in window 47. When lever 14 (Figure 3) is moved upwardly, it turns setting gear and detent plate 212 (Figure 3), which acts through pinion 216 to turn shaft 214. Shaft 214 acts through gear 218 to turn gear 220 of differential 222 (Figure 16). Gear 220 acts through the differential pinions of differential 222 to turn differential setting gear 224. Gear 224 turns the setting gear 226 of setting assembly 228.

As gear 226 turns, it acts through a helical gear 226a (Figure 29) connected to it, to turn gear 230 (Figure 30), which is mounted on a shaft 234 extending transversely across head shaft 96. Gear 230 turns a gear 232 mounted on its hub, and gear 232 in turn moves rack 236 longitudinally of the head shaft. Rack 236 has a portion 236a (Figure 33) on its forward end which is similar to portion 113a of rack 118 (Figure 28). Teeth on the upper edge of portion 236a (Figure 33) mesh with and drive a gear connected to type wheel 26. Thus, as setting lever 14 is moved, the type wheel 26 in the printing head is set.

When setting gear 226 is turned with respect to the registering portion of setting assembly 228 (Figure 29), three teeth on the registering portion of setting assembly 228 are moved into operative position. As the head shaft turns during an operating cycle, these teeth act upon and turn Geneva gear 376 (Figure 43). Gear 376 has a gear 377 connected to it which meshes with and drives idler gear 384. Idler gear 384 feeds three cents into the ascending register 32 (Figure 41), and subtracts three cents from the descending register 34.

At the beginning of an operating cycle, disc 168 (Figures 2 and 19) turns, forcing roller 172 out of recess 176. This turns shaft 178 in a clockwise direction and moves the aligning fingers 182, 183 and 185 (Figure 3) into locking engagement with the aligner discs 186, 187 and 189. Shaft 74 is driven through gear 101 (Figures 2 and 6) during the operating cycle by gear 103 which is mounted on head shaft 96. The differential assemblies are driven at a sufficient rate of speed by shaft 74 to cause their setting gears 68, 220 and 221 to turn the setting gears of the setting assemblies at the same rate of speed as the head shaft 96. This prevents the two sections of the setting assemblies from moving with respect to each other during an operating cycle.

To re-set the descending register, the user or Post Office employee pulls outwardly on the center portion 424c of bracket 424 (Figures 44 and 45). The side plates 416 and 418 which are swung outwardly when bracket 424 is moved upwardly, act upon rod 408 to move it downwardly to the position it occupies in Figure 45; and plate 418 raises lever arm 665 to disengage zero locking fingers 640, 642, 644 and 646 if the descending register has been zero locked by exhaustion of register set postage, as previously explained. When rod 408 moves downwardly, Geneva gears 390, 391, 392, 393, 394, and 395 are moved out of carryover position. At this time, the higher order counterwheels which have been freed from the zero locking means may be reset. The center portion 424c of bracket 424 is next moved downwardly to the position it occupies in Figure 44. At this time the Geneva gears of the descending register are again in carryover position.

To change the setting of the dies on the printing head, knob 486 (Figures 3 and 4) is pulled out and turned into any one of four different positions. When knob 486 is turned, it turns cam 518 (Figure 31) and its periphery acts upon rollers 544 and 546 to move the supports 520 and 522 for the date and town circle dies into printing position. Cam 518 also acts on roller 564 to move bell crank 560 in a clockwise direction. Bell crank 560 acts on arm 552a of P. L. and R. die support 552 (Figure 34) to move die 550 into printing position. Springs 538, 540 and 566 (Figures 33 and 34) hold these dies out of printing position with their support rollers 544, 546 and 564 in engagement with the periphery of cam 518 (Figure 31) when the dies are not in printing position.

Thus, it will be seen that a practical and efficient meter has been disclosed, in which the several objects hereinabove mentioned, as well as many others, are successfully accomplished. In this meter, the gear train between the setting levers, the type wheels in the printing head, and the register is always in mesh. Thus, there is never a chance for an error, which can occur in meters in which the gear train is interrupted during each cycle of operation. The dies on the printing head are readily settable by a single knob on the forward end of the printing head. Thus, the setting of the dies may be easily and quickly changed. The descending register is so constructed that it may be easily and quickly reset without the use of a stylus. The zero lock mechanism is positive in operation and acts directly upon the head shaft to prevent operation of the meter when the supply of postage becomes exhausted. Furthermore, this meter is constructed in four separate units so that it may be easily and quickly repaired by replacing any one of the four units which needs to be repaired.

As many possible embodiments may be made of the above invention, all without departing from the scope of the invention, it is to be understood that all matter hereinabove set forth, or shown in the accompanying drawings, is to be interpreted as illustrative, and not in a limiting sense.

I claim:

1. In a meter for a metered mailing machine, in combination, a main frame, a self-contained setting mechanism unit, a self-contained printing head unit, a self-contained registering unit, each of said last two units including mechanism actuated by said setting mechanism unit, and means detachably mounting each of said units as a unit on said main frame.

2. In a meter for a metered mailing machine, in combination, a main frame, a self-contained setting mechanism unit, a self-contained printing head unit, a self-contained registering unit, intermeshing gear mechanism operable by said setting unit and with each of said units including portions of said intermeshing gear mechanism to drive the last two of said units from the first, means independently and detachably mounting said setting mechanism unit on said main frame, means independently and detachably mounting said printing head unit on said main frame, and means independently and detachably mounting said registering unit on said main frame, whereby each unit may be removed as a unit from said main frame.

3. In a meter for a metered mailing machine, in combination, a main frame, a self-contained setting mechanism unit, a self-contained printing head unit, a self-contained registering unit, intermeshing gear mechanism with each of said units including as parts of said gear mechanism gear means meshing with other gear means of said gear mechanism whereby said setting unit drives the other two units, means independently and detachably mounting said setting mechanism unit on said main frame, means independently and detachably mounting said printing head unit on said main frame, means independently and detachably mounting said registering unit on said main frame, said gear means being so positioned that said setting and registering units may be detached as units from said main frame without detaching any of said other units.

4. In a meter for a metered mailing machine, in combination, a main frame, a self-contained setting unit including differential assemblies mounted on said frame, means detachably mounting said setting unit on said main frame, printing and registering mechanism including setting assemblies demountably mounted on said main frame, and disengageable setting gear means operatively connecting said differential assemblies of said setting unit with said setting assemblies of said printing and registering mechanism.

5. In a meter for a metered mailing machine, in combination, a main frame, setting mechanism mounted on said main frame, a self-contained detachable registering unit mounted on said main frame, a self-contained detachable printing head unit mounted on said main frame, and means operatively connecting said setting mechanism with said printing head and registering units, said registering unit being detachable as a unit from said meter and said printing head unit being detachable from said meter after said registering unit has been loosened in said meter and disengaged from said head unit.

6. In a meter for a metered mailing machine, in combination, a main frame including a base plate, a front plate, and a rear plate, a setting unit detachably mounted on said front and rear plates, a printing head unit including a shaft extending through said rear plate detachably mounted on said front plate, and a registering unit including ascending and descending registers detachably mounted on said front and rear plates.

7. In a meter for a metered mailing machine, in combination, a main frame including a base plate, a front plate, and a rear plate, setting and registering mechanism mounted on said main frame, a printing head unit, means operatively connecting the mechanism of said printing unit with said setting and registering mechanism, means forming a hole in said front plate, a portion of said printing head unit extending through said hole and being mounted on said rear plate by a bearing, and a sub-frame on said printing head unit for mounting said printing head unit on said front plate.

8. In a meter for a metered mailing machine, in combination, a frame including a base plate, a front plate, and a rear plate, setting and printing mechanism mounted on said frame, a registering unit including ascending and descending registers and freeable locking mechanism to permit resetting said descending register, said registering unit including front and rear plates, and means detachably connecting said last mentioned front and rear plates to said main frame front and rear plates, whereby said registering unit may be detached from said meter as a unit.

9. In a meter for a metered mailing machine, in combination, a main frame including a base plate, a registering unit detachably mounted on said main frame, a printing head unit detachably mounted on said main frame, a setting mechanism unit mounted on said main frame, each of said units being detachable from said main frame, a housing completely enclosing said units and secured and seated to said base plate, said housing preventing unauthorized tampering access to and removal of said units from said main frame unless said housing is disconnected from said base plate.

10. In a meter for a metered mailing machine, in combination, a printing head, means for rotating said head through one revolution during each printing operation, a plurality of dies mounted on said head, means mounting each die for movement into and out of printing position and manually operable common cam means capable of being set in a plurality of different angular positions for moving said dies selectively into and out of printing positions in response to different angular settings of said cam means.

11. In a meter for a metered mailing machine, in combination, a printing head, means for rotating said head through one revolution during each printing operation, a plurality of dies, a support for each die, means pivotally mounting each support on said printing head, means resiliently holding each support out of printing position, and manually operable common cam means capable of being set in a plurality of different angular positions for moving said supports and thus said dies selectively into and to permit them to move out of printing positions in response to different angular settings of said cam means.

12. In a meter for a metered mailing machine, in combination, a printing head, a plurality of dies, a support for each die, means pivotally mounting said supports on said printing head, the axis of said last mentioned means being parallel to the axis of rotation of said printing head, common cam means capable of being set in a plurality of different angular positions and acting upon said supports for moving said supports selectively into printing positions in response to different angular settings of said cam means, and spring means for resiliently holding said supports out of printing position when permitted by said cam means.

13. In a meter for a metered mailing machine, in combination, a printing head, means for rotating said printing head through one revolution during each printing operation, a plurality of dies, a support for each die, means pivotally mounting each of said supports on said printing head, the axis of said last mentioned means being parallel to the axis of rotation of said printing head, a cam rotatably mounted on said printing head, the axis of rotation of said cam being the same as the axis of rotation of said printing head, and means for rotating said cam, each of said supports including an arm extending across the periphery of said cam, said cam being so shaped that it moves the dies into printing position as it is rotated.

14. In a meter for a metered mailing machine, in combination, a printing head, means for rotating said printing head through one revolution during each printing operation, a plurality of dies, a support for each die, means pivotally mounting each of said supports on said printing head, the axis of said last mentioned means being parallel to the axis of rotation of said printing head, a flat cam, means rotatably mounting said cam on said printing head, the axis of rotation of said cam being the same as the axis of rotation of said printing head, manually operable means for rotating said cam, each of said supports including an arm extending across the periphery of said cam, rollers on said arms for engaging the periphery of said cam, and spring means resiliently holding said supports and thus said dies out of printing position, said cam being so shaped that it moves said dies into printing position as said cam is rotated.

15. In a meter for a metered mailing machine, in combination, a printing head, means for rotating said head through one revolution during each printing operation, a plurality of dies, a support for each die, means pivotally mounting each support on said printing head, a spring connecting each support to said printing head for resiliently holding said dies out of printing position, and a manually operable cam for moving said supports and thus said dies into printing position as said cam is rotated.

16. In a meter for a metered mailing machine, in combination, a printing head, means for rotating said printing head through one revolution during each printing operation, a plurality of dies, a support for each die, means pivotally mounting each of said supports on said printing head, the axis of said last mentioned means being parallel to the axis of rotation of said printing head, a flat cam rotatably mounted on said printing head, said supports including portions extending across the periphery of said cam, means for rotating said cam, and spring means for holding said support portions in engagement with the periphery of said cam, said cam having a series of high and low points on its periphery, whereby as said cam is turned different points on its periphery either hold a die in printing position or permit said spring means to hold it out of printing position whereby different combinations of dies may be held in printing position.

17. In a meter for a metered mailing machine, in combination, a printing head, a die mounted on said printing head, a support for said die, means pivotally mounting said support on said printing head, a spring resiliently holding said support out of printing position, and a manually operable flat cam rotatably mounted on said printing head, said support including an arm portion extending across the periphery of said cam, the periphery of said cam having a series of high and low points so that when said cam is turned it acts through said arm portion to control the position of said die.

18. In a meter for a metered mailing machine, in combination, a printing head, means for rotating said head through one revolution during each printing operation, a pair of dies, a support for each die, a single pin pivotally mounting both dies on said printing head, each support having an arm portion, a cam rotatably mounted on said printing head, said arm portions extending across the periphery of said cam, and spring means resiliently holding said arm portions in engagement with the periphery of said cam, said cam being so shaped that it moves said dies selectively into printing position as it is turned.

19. In a meter for a metered mailing machine, in combination, a printing head, means for rotating said head through one revolution during each printing operation, a die, a support for said die, means pivotally mounting said support on said printing head, the pivotal axis of said last mentioned means being transversely positioned with respect to the axis of said printing head, one end of said support extending through the front of said printing head, a bell crank pivotally mounted on the forward end of said printing head, the pivotal axis of said bell crank being parallel to the axis of rotation of said printing head, rotatable cam means mounted on said printing head, one arm of said bell crank engaging the periphery of said cam, the other arm of said bell crank extending over the forward end of said support, spring means holding said die out of printing position and holding the forward end of said support in engagement with said last mentioned bell crank arm, and means for rotating said cam, said cam having a series of high and low points on its periphery and acting on rotation through said bell crank and support to move said die into printing position.

20. In a meter for a metered mailing machine, in combination, a printing head, means for rotating said printing head through one revolution during each printing operation, a plurality of dies, a support for each die, means pivotally mounting each of said supports on said printing head, the axis of said last mentioned means being parallel to the axis of rotation of said printing head, common cam means rotatively mounted on said printing head, each of said supports including an arm extending across the periphery of said cam, said cam being so shaped that it moves the dies selectively into printing position as it is rotated, a knob, means operably connecting said knob to said cam, means forming a series of index holes in said printing head, and manually operable locking means associated with said knob, said locking means being disengaged from one index hole and reengaged with another each time said knob is turned.

21. In a register, in combination, a main frame; a shaft mounted on said main frame; a series of counterwheels mounted on said shaft; means for feeding digits into said counterwheels; a series of Geneva carryover gears; and means operatively connecting each Geneva carryover gear with one of said counterwheels and the counterwheel of the next higher order including a sub-frame pivotally mounted on said main frame, a cam follower mounted on said sub-frame, said Geneva carryover gears being rotatably mounted on said sub-frame, and a secondary frame pivotally mounted on said main frame and having cam slots interfitting with said cam follower, said cam follower of said sub-frame and said cam slots of said secondary frame being shaped and positioned to swing said sub-frame away from said counterwheels when said secondary frame is pulled away from said main frame whereby said carryover gears are moved out of engagement with said counterwheels thus permitting resetting of said counterwheels.

22. In a locking mechanism for the meter of a metered mailing machine, said meter being detachably mounted on the power unit of said metered mailing machine, in combination, a shaft rotatable during each cycle of operation, said shaft when prevented from turning preventing operation of said meter, and a locking finger movable into and out of locking engagement with respect to said shaft, pin means on said meter operably connected to said finger, means on said power unit for withdrawing said pin and thus moving said finger to an inoperative position when said meter is mounted on said power unit, locking means for locking said locking finger, and key means on said power unit for unlocking said locking means, said locking means preventing said pin from moving said finger to an unlocked position unless said meter is mounted on said power unit.

23. In a locking mechanism for the meter of a metered mailing machine, said meter being detachably mounted on the power unit of said metered mailing machine, in combination, a shaft rotatable during each cycle of operation, said shaft when prevented from turning preventing operation of said meter, a locking finger movable into and out of locking engagement with respect to said shaft, pin means on said meter connected to said finger, means on said power unit for withdrawing said pin and thus moving said finger to an inoperative position when said meter is mounted on said power unit, a lock on said meter for locking said pin means, and key means on said power unit adapted to unlock said locking means when said meter is mounted on said power unit.

24. In a locking mechanism for the meter of a metered mailing machine, said meter being detachably mounted on the power unit of said metered mailing machine, in combination, a shaft rotatable during each cycle of operation, said shaft when prevented from turning preventing operation of said meter, a locking finger movable into and out of locking engagement with respect to said shaft, pin means on said meter operably connected to said finger, means on said power unit for withdrawing said pin and thus moving said finger to an inoperative position when said meter is mounted on said power unit, key means on said power unit, and locking elements on said meter which prevent said locking fingers from being moved to an inoperative position when said locking elements are in a locked position, said key means moving said locking elements to unlocked position when said meter is mounted on said power unit.

25. In a locking mechanism for the meter of a metered mailing machine, said meter being detachably mounted on the power unit of said metered mailing machine, in combination, a housing enclosing the mechanism of said metered mailing machien, means for locking the mechanism of said metered mailing machine, a pin having a portion extending externaly of said housing, means connecting said pin to said locking means, movement of said pin controlling the locking of said meter through said locking means, locking means on said meter controlling movement of said pin, and key means on said meter for moving said locking means to unlocked position when said meter is mounted on said power unit.

26. In a locking mechanism for the meter of a metered mailing machine, said meter being detachably mounted on the power unit of said metered mailing machine, in combination, a housing enclosing the mechanism of said metered mailing machine, means for locking the mechanism of said metered mailing machine, a pin having a portion extending externally of said housing, means connecting said pin to said locking means, movement of said pin controlling the locking of said meter through said locking means, a plurality of locking elements mounted on said meter, means forming a slot in each of said locking elements, a locking bar controlling the movement of said pin, and key means on said power unit for aligning the slots in said locking elements when said meter is mounted on said power unit, said locking bar moving into said slots when said slots are aligned to permit said pin to be moved to an unlocked position.

27. In a locking mechanism for the meter of a metered mailing machine, said meter being detachably mounted on the power unit of said metered mailing machine, in combination, a lever for locking the mechanism of said meter, said lever being in the form of a bell crank pivotally mounted on the framework of said meter, a housing enclosing said meter, a pin movably mounted on said meter and having a portion extending externally of said housing, one arm of said bell crank being connected to said pin and the other arm of said bell crank locking the mechanism of said meter, spring means resiliently urging said lever into locking position, a locking bar, a series of locking elements pivotally mounted on said meter, means forming a slot in each of said locking elements, said locking bar preventing movement of said lever into unlocked position unless said locking bar moves into the slots in said locking elements, and key means on said power unit for moving said locking elements so that the slots therein are aligned when said meter is mounted on said power unit.

28. In a meter for a metered mailing machine, in combination, a main shaft, a printing head mounted on said shaft, means for driving said shaft, a removable die mounted on said printing head, a housing enclosing said printing head, a door in said housing to permit access to said printing head, means for locking the mechanism of said meter, means connecting said door to said last mentioned means, said door when opened acting through said last mentioned means to move said locking member into locked position.

29. In a meter for a metered mailing machine, in combination, a main shaft, a printing head mounted on said shaft, means for driving said shaft, a removable die mounted on said printing head, a housing enclosing said printing head, a door in said housing to permit access to said die, a lever for locking the mechanism of said meter, a spring holding said lever in unlocked position, a shaft, means mounting said door on said shaft, said door turning said shaft when said door is opened, and cam means on said shaft, said cam means moving said lever to locked position when said door is opened.

30. In a meter for a metered mailing machine, in combination, a lever for locking the mechanism of said meter, a descending register, a finger for each of the higher order counterwheels in said register, the nose portions of each of said fingers being aligned with notches in discs connected to each of said counterwheels when said counterwheels are in zero position, means connecting each of said fingers, means connecting said last mentioned means to said lever and spring means for moving said lever into locked position when said fingers enter the notches in said discs.

31. In a meter for a metered mailing machine, in combination, a shaft rotatably mounted on the framework of said meter, a series of fingers mounted on and connected to said shaft, a descending register, a notched disc connected to each counterwheel, each of said fingers being aligned with respect to one of said notched discs, spring means resiliently urging said fingers toward said notched discs, the notches in said discs being aligned when said counterwheels reach zero position at which time the nose portions of said fingers are moved by said spring means into said notches, a lever connected to said shaft, means on said lever for locking the head shaft of said meter, said last mentioned means moving into locking engagement with said head shaft when the nose portions of said fingers enter the notches in the discs with which they are aligned.

32. In a meter for a metered mailing machine, in combination, a shaft rotatably mounted on the framework of said meter, a series of fingers mounted on and connected to said shaft, a descending register, a notched disc connected to each counterwheel, each of said fingers being aligned with respect to one of said notched discs, spring means resiliently urging said fingers toward said notched discs, the notches in said discs being aligned when said counterwheels reach zero position at which time the nose portions of said fingers are moved by said spring means into said notches, a lever connected to said shaft, means on said lever for locking the head shaft of said meter, said last mentioned means moving into locking engagement with said head shaft when the nose portions of said fingers enter the notches in the discs with which they are aligned and means adapted to move the nose portions of said fingers away from said notched discs upon rotation of said shaft during meter operation.

33. In a meter for a metered mailing machine, in combination, a shaft rotatably mounted on the framework of said meter, a series of fingers mounted on and connected to said shaft, a descending register, a notched disc connected to each counterwheel, each of said fingers being aligned with respect to one of said notched discs, spring means resiliently urging said fingers toward said notched discs, the notches in said dics being aligned when said counterwheels reach zero position at which time the nose portions of said fingers are moved by said spring means into said notches, a lever connected to said shaft, means on said lever for locking the head shaft of said meter, said last mentioned means moving into locking engagement with said head shaft when the nose portions of said fingers enter the notches in the discs with which they are aligned, cam means on said shaft, and cam follower means associated with said cam means and said fingers, said last mentioned means adapted to cam said fingers away from said discs during a cycle of operation of said meter.

34. The combination defined in claim 21 in which there are fingers associated with said sub-frame and adapted to engage said counterwheels when said counterwheels are disengaged from said Geneva carryover gears.

35. The combination defined in claim 34 in which said fingers are pivoted on the same axis as said sub-frame.

36. The combination defined in claim 34 in which there is a resilient means adapted to urge said fingers toward said counterwheels, and means associated with said secondary frame to move said fingers away from said counterwheels against the action of said resilient means when said Geneva carryover gears are intermeshed with said counterwheels.

37. The combination defined in claim 21 in which there are fingers adapted to engage said Geneva carryover gears when said gears are disengaged from said counterwheels.

38. The combination defined in claim 37 in which there is a resilient means urging said fingers toward said Geneva carryover gears, and means associated with said secondary frame for holding said fingers away from said carryover gears when said secondary frame is in its closed position.

39. The combination defined in claim 37 in which there is a resilient means to urge said fingers against said carryover gears when said gears are disengaged from said counterwheels.

40. The combination defined in claim 21 in which the sub-frame for supporting said Geneva carryover gears includes a shaft connected to the main frame, a cam follower and series of links pivotally connected to said shaft and another series of said links connected to said cam follower.

41. The combination defined in claim 40 in which there is an individual connection between each of said carryover gears and said cam follower.

42. The combination defined in claim 40 in which said secondary frame includes a pair of plates pivotally mounted on said main frame, said plates having cam slots associated with said cam follower whereby pivotal movement of said plates effects a camming action on said cam follower.

43. The combination defined in claim 21 in which said cam follower comprises a rod mounted in said cam slots, links between said rod and said carryover gears, and mechanism for pivoting said secondary frame with respect to said main frame to effect said camming action.

44. The combination defined in claim 21 in which there are a plurality of fingers urged against said counterwheels, and constructed to lock each of said wheels against further rotation when they reach zero position and means associated with said secondary frame adapted to cam said fingers away from said counterwheels when said carryover gears are disengaged from said counterwheels.

45. The combination defined in claim 21 in which there is mechanism including fingers for locking each of said counterwheels against further rotation when they reach zero position, and means forming a leverage system between said fingers and said secondary frame constructed to disengage said fingers from counterwheels to unlock them whenever said secondary frame is swung open to move said Geneva carryover gears from said counterwheels.

46. The combination defined in claim 45 in which said leverage system includes an arm with one end adapted to engage a cam surface on said secondary frame.

References Cited in the file of this patent

UNITED STATES PATENTS

| | | |
|---|---|---|
| 1,098,353 | Morse | May 26, 1914 |
| 1,758,461 | Ogden | May 13, 1930 |
| 1,853,052 | Horton | Apr. 12, 1932 |
| 1,895,848 | Gubelmann | Jan. 31, 1933 |
| 2,371,070 | Sager et al. | Mar. 6, 1945 |
| 2,482,935 | Rast | Sept. 27, 1949 |
| 2,516,920 | Ryan et al. | Aug. 1, 1950 |

FOREIGN PATENTS

| | | |
|---|---|---|
| 610,472 | Great Britain | Oct. 15, 1948 |